United States Patent
Ohta et al.

[19]

[11] Patent Number: 6,164,842
[45] Date of Patent: Dec. 26, 2000

[54] CAMERA HAVING A LENS BARRIER UNIT OPENING/CLOSING MECHANISM

[75] Inventors: Hidefumi Ohta, Kawasaki; Kiyosada Machida, Urawa; Junichi Omi, Kawasaki; Hiroshi Wakabayashi, Yokohama; Hitoshi Aoki; Yoshihiro Takeuchii, both of Tokyo, all of Japan

[73] Assignee: Nikon Corporation, Tokyo, Japan

[21] Appl. No.: 09/107,402

[22] Filed: Jun. 30, 1998

Related U.S. Application Data

[63] Continuation-in-part of application No. 08/928,257, Sep. 12, 1997, abandoned, which is a continuation of application No. 08/968,512, Nov. 12, 1997, abandoned, which is a continuation of application No. 08/608,367, Feb. 28, 1996, abandoned, which is a continuation of application No. 08/664,125, Jun. 14, 1996, abandoned.

[30] Foreign Application Priority Data

| Feb. 28, 1995 | [JP] | Japan | 7-040975 |
| Jun. 14, 1995 | [JP] | Japan | 7-171445 |

[51] Int. Cl.[7] ............................. G03B 17/04
[52] U.S. Cl. .............................. 396/349; 396/448
[58] Field of Search ......................... 396/448, 348, 396/349, 350, 534

[56] References Cited

U.S. PATENT DOCUMENTS

| Re. 34,453 | 11/1993 | Kamitani et al. | 396/72 |
| 4,420,236 | 12/1983 | Taniguchi | 396/210 |
| 4,752,796 | 6/1988 | Tsukahara | 396/349 |
| 4,864,338 | 9/1989 | Wakabayashi | 396/349 |
| 4,868,590 | 9/1989 | Yokota | 396/75 |
| 5,602,607 | 2/1997 | Kato et al. | 396/349 |
| 5,761,556 | 6/1998 | Ichino | 396/349 |
| 5,950,028 | 9/1999 | Ito | 396/349 |

FOREIGN PATENT DOCUMENTS

| 60-78434 | 5/1985 | Japan . |
| 60-78435 | 5/1985 | Japan . |
| 7-49515 | 2/1995 | Japan . |

*Primary Examiner*—W. B. Perkey

[57] ABSTRACT

A camera having a lens barrier unit that opens without encountering obstructions in response to the operation of an operating member and without increasing the size of the lens barrel of the camera. The lens barrier unit covers the front surface of a photographic lens in a closed position, and moves clear of the front surface of the photographic lens in an open position. A sliding member, which is a separate member from the operating member, mechanically drives the lens barrier unit to an open position in response to the movement of an operating member by means of the operation for photographic preparation (e.g., when the camera is switched ON), and drives the lens barrier unit to a closed position, by coupling to the movement of the photographic lens unit while moving from the extended position to the retracted position (e.g., when the camera is switched OFF). The camera may include a finder optical system for visually recognizing an image of an object, with the sliding member disposed in the vicinity of a film aperture. The slide member is disposed in a face-to-face position to the finder optical system with the film aperture being interposed therebetween.

25 Claims, 13 Drawing Sheets

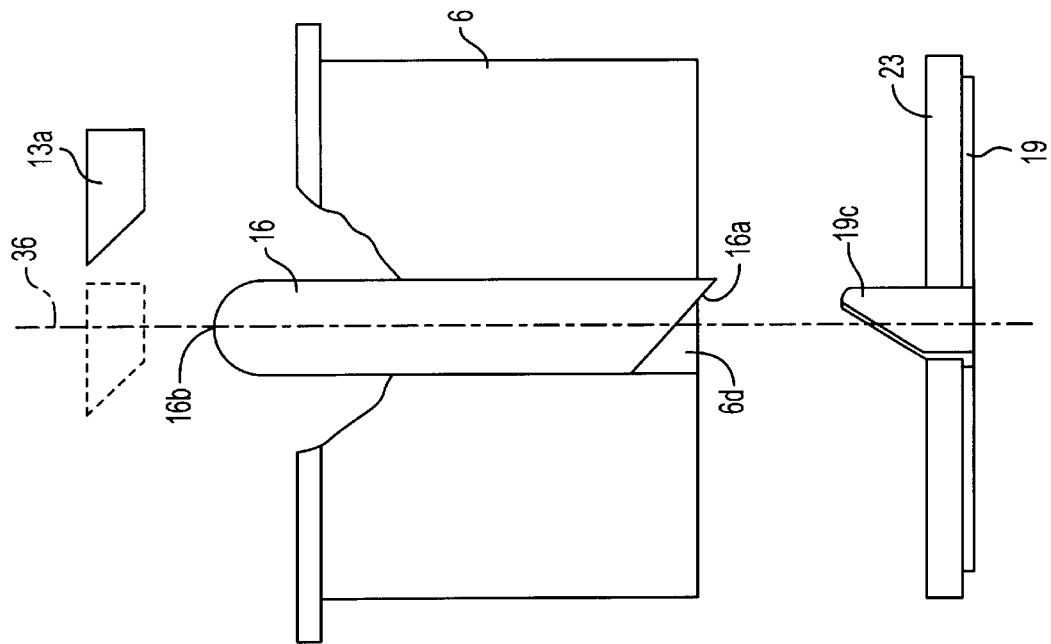
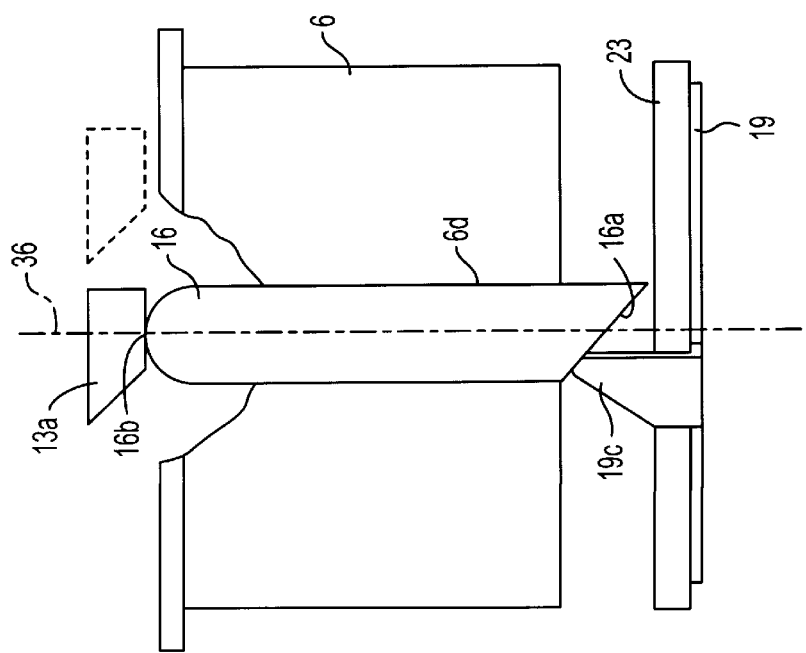

CAMERA HAVING A LENS BARRIER UNIT OPENING/CLOSING MECHANISM

CROSS-REFERENCE TO RELATED APPLICATIONS

This application is based upon and claims priority of Japanese Patent Application No. 07-171445, filed Jun. 14, 1995 and Japanese Patent Application No. 07-040975, filed Feb. 28, 1995, and is a continuation-in-part of U.S. patent application Ser. No. 08/928,257, filed Sep. 12, 1997, now abandoned, which in turn is a continuation of U.S. patent application Ser. No. 08/968,512 filed Nov. 12, 1997, now abandoned, which is a continuation of U.S. patent application Ser. No. 08/608,367, filed Feb. 28, 1996, now abandoned, which in turn is a continuation of U.S. patent application Ser. No. 08/664,125 filed Jun. 14, 1996, now abandoned, the contents being incorporated herein by reference.

BACKGROUND OF THE INVENTION

1. Field of the Invention

The present invention relates to a camera having a lens barrier unit which opens and closes accompanying the extension and retraction of a photographic lens unit, and, more particularly, the present invention relates to a lens barrier unit opening and closing mechanism for opening and closing lens barriers which cover a camera lens.

2. Description of the Related Art

Cameras having lens barrier unit for covering a front surface of a photographic lens unit are known. For example, a camera having a lens barrier unit and a moveable photographic lens unit are disclosed in Japanese Examined Patent Publications JP-B-4-49931 and JP-B-4-49932.

These known cameras are equipped with an operating member, capable of an operation for photographic preparation (camera is switched ON) and an operation for the conclusion of photography (camera is switched OFF). These known cameras are also equipped with a photographic lens unit that moves to an extended position, in response to the operation for photographic preparation, and moves to a retracted position, in response to the operation to conclude photography.

The photographic lens unit of the above-described cameras includes a lens barrier unit having a plurality of lens barriers, and which is capable of moving between a closed position, in which the lens barrier unit covers a front surface of the photographic lens unit, and an open position, in which the lens barrier unit moves away from the front surface of the photographic lens unit.

When the camera operating member is operated for photographic preparation, a barrier opening and closing unit, moving integrally with the operating member, drives the lens barrier unit to the open position.

When the camera operating member is operated for the conclusion of photography, the barrier opening and closing unit, which is coupled to the retraction operation of the photographic lens unit, drives the lens barrier unit to the closed position.

However, when the above-mentioned photographic lens unit is a high magnification zoom lens, the distance of the lens barrier unit from the camera body becomes long, to an extent that the lens barrel becomes long, making it necessary for the barrier opening and closing unit to become long.

As a result, because the barrier opening and closing unit of the above-mentioned known cameras moves integrally with an operating member disposed in the camera body, when the length of the barrier opening and closing unit becomes long, it becomes difficult for the end of the barrier opening and closing unit (connected to the lens barrier unit) to move by the same amount as the operating stroke of the operating member, due to the effect of bending. Therefore, there is a risk that opening and closing can be obstructed. To overcome this risk, prior art cameras have a barrier opening and closing member that is made thick to suppress bending, and, accordingly, the lens barrel has to become larger.

Further, a lens barrier opening/closing mechanism is known having a moving member which slides in a film feeding direction on an upper side of a film aperture. The moving member slides interlocking with a main switch of the camera. Further, a rectilinear movement lens barrel of a photographing lens is provided with a barrier rod slidable in an optical-axis direction. The barrier rod might contact the moving member. The moving member is formed with a stepped portion. When the main switch is turned ON, the moving member slides in the film feeding direction. The moving member is formed with the stepped portion, and hence the barrier rod that contacts the moving member displaces in the optical-axis direction. With the displacement of the barrier rod, the barrier provided in front of the lens barrel is opened and closed.

A portion where the moving member can be disposed is limited on the surface of the camera body. The moving member is a member for moving the barrier rod by coming into contact with the barrier rod provided in the rectilinear movement lens barrel and is therefore required to be provided on an outer periphery of the rectilinear movement lens barrel in such a position as to give no interference with the film aperture. A variety of mechanisms in addition to the moving member must be disposed upwardly of the film aperture. For example, a finder mechanism for observing an object is provided upwardly of the film aperture. Providing the camera incorporating the finder mechanism with the above-mentioned barrier opening/closing mechanism entails determining a layout so that the slidable moving member does not interfere with the finder mechanism.

Thus, it is difficult to dispose the moving member and the finder mechanism so as not to interfere with each other in a confined space above the film aperture.

Further, there has been recently known a camera using a known film that is magnetically writable and constructed to detect a timing of feeding the film and a timing of executing a magnetic writing process by use of two photo interrupters (photo reflectors). In such a camera, it is determined that the two photo interrupters are disposed upwardly of the aperture, while a magnetic head for magnetic writing is disposed downwardly of the aperture. It is therefore difficult to provide the barrier opening/closing mechanism together therewith upwardly of the aperture.

Moreover, with further down-sizing of the camera, a diameter of the lens barrel has been also reduced. The reduction in diameter of the lens barrel makes it difficult to dispose the above-mentioned barrier opening/closing mechanism in the conventional position.

SUMMARY OF THE INVENTION

Accordingly, it is an object of the present invention to provide a camera having a lens barrier unit that can be reliably opened and closed, without encountering obstructions, whose movement corresponds to the operation of an operating member, without increasing the size of the lens barrel of the camera.

It is another object of the present invention to provide a camera having an intermediate coupling member, which drives the lens barrier unit to an open or a closed position, which is not integral with, but is a separate member from the operating member of the camera.

It is yet another object of the present invention to dispose a barrier opening/closing mechanism together, even in such a camera that a diameter of a lens barrel is set small, with a finder mechanism with a film feed detecting device, which are provided upwardly of an aperture.

Objects and advantages of the present invention are achieved in accordance with embodiments of the present invention by providing a camera comprising an operating member, a photographic lens unit, operable between a retracted position and an extended position, a lens barrier unit, operable between a closed position and an open position, and an intermediate coupling member which drives the lens barrier unit to an open position and to a closed position in response to movement of said operating member.

The lens barrier unit covers a front surface of said photographic lens while in a closed position, and moves clear of the front surface of the photographic lens while in an open position. The intermediate coupling member, which is separate from the operating member, drives the lens barrier unit to an open position, in response to movement of the operating member during operation for photographic preparation, and drives the lens barrier unit to a closed position, in response to movement of the photographic lens unit when moving from an extended position to a retracted position in response to an operation for the conclusion of photography.

Objects and advantages of the present invention are achieved in accordance with embodiments of the present invention with a barrier opening/closing camera comprising photographing lens openable/closable barriers assuming a closed state for covering a photographing lens and an opened state for uncovering the photographing lens. The barrier opening/closing camera also comprises a finder optical system for visually recognizing an image of an object, and a slide member, disposed in the vicinity of a film aperture, for opening and closing the photographing lens barriers by the slide member operating. The slide member is disposed in a face-to-face position to the finder optical system with the film aperture being interposed therebetween.

Further, a barrier opening/closing camera in accordance with embodiments of the present invention comprises photographing lens openable/closable barriers assuming a closed state for covering a film aperture and an opened state for uncovering the film aperture. The barrier opening/closing camera also comprises a film feed detecting device for detecting a film feed state by detecting a film perforation, and a slide member disposed in the vicinity of the film aperture for opening and closing the photographing lens barriers by the slide member operating. The slide member is disposed in a face-to-face position to the film feed detecting device with the film aperture being interposed therebetween.

In the above-constructed barrier opening/closing camera, the slide member is disposed in the face-to-face position to the film feed detecting device as well as to the finder optical system with the film aperture being interposed therebetween. With this arrangement, the barrier opening/closing mechanism can be provided together even in such a camera that the finder mechanism and the film feed detecting device are disposed upwardly of the aperture.

BRIEF DESCRIPTION OF THE DRAWINGS

The above and other objects and advantages of the invention will become apparent and more readily appreciated from the following description of the preferred embodiments, taken in conjunction with the accompanying drawings of which:

FIG. 9 is an explanatory view showing a collapsible state in the second embodiment of the barrier opening/closing camera of the present invention.

FIG. 10 is an explanatory view showing a wide-angle state in the second embodiment of the barrier opening/closing camera of the present invention.

It is recognized that the above diagrams are used to facilitate understanding of the structure, means, and operations of the present invention, and are not intended to limit the present invention in any way.

DESCRIPTION OF THE PREFERRED EMBODIMENTS

Reference will now be made in detail to embodiments of the present invention.

Figure 1:
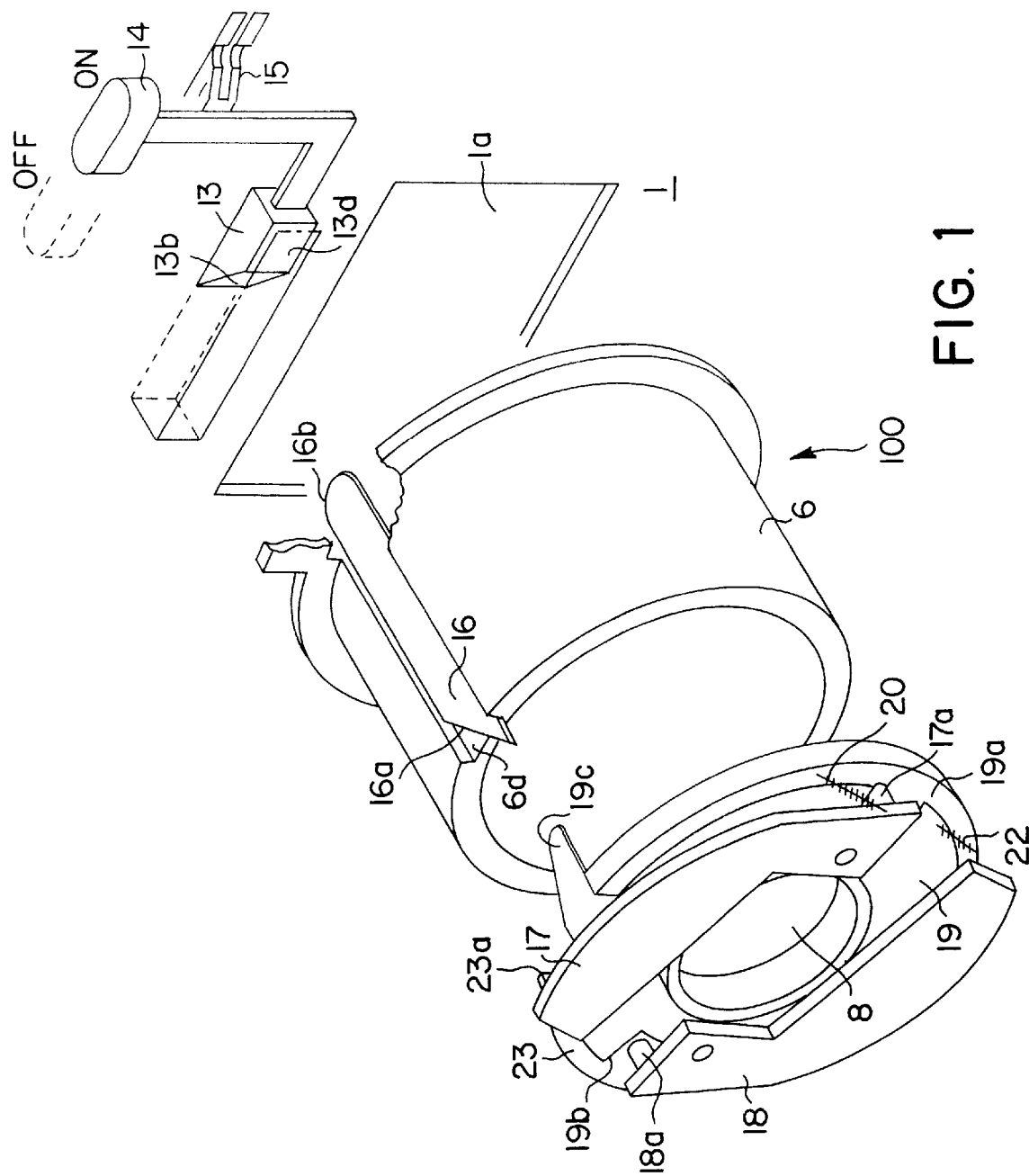
FIG. 1 is an oblique diagram showing a camera according to a first embodiment of the present invention.
Figure 2:
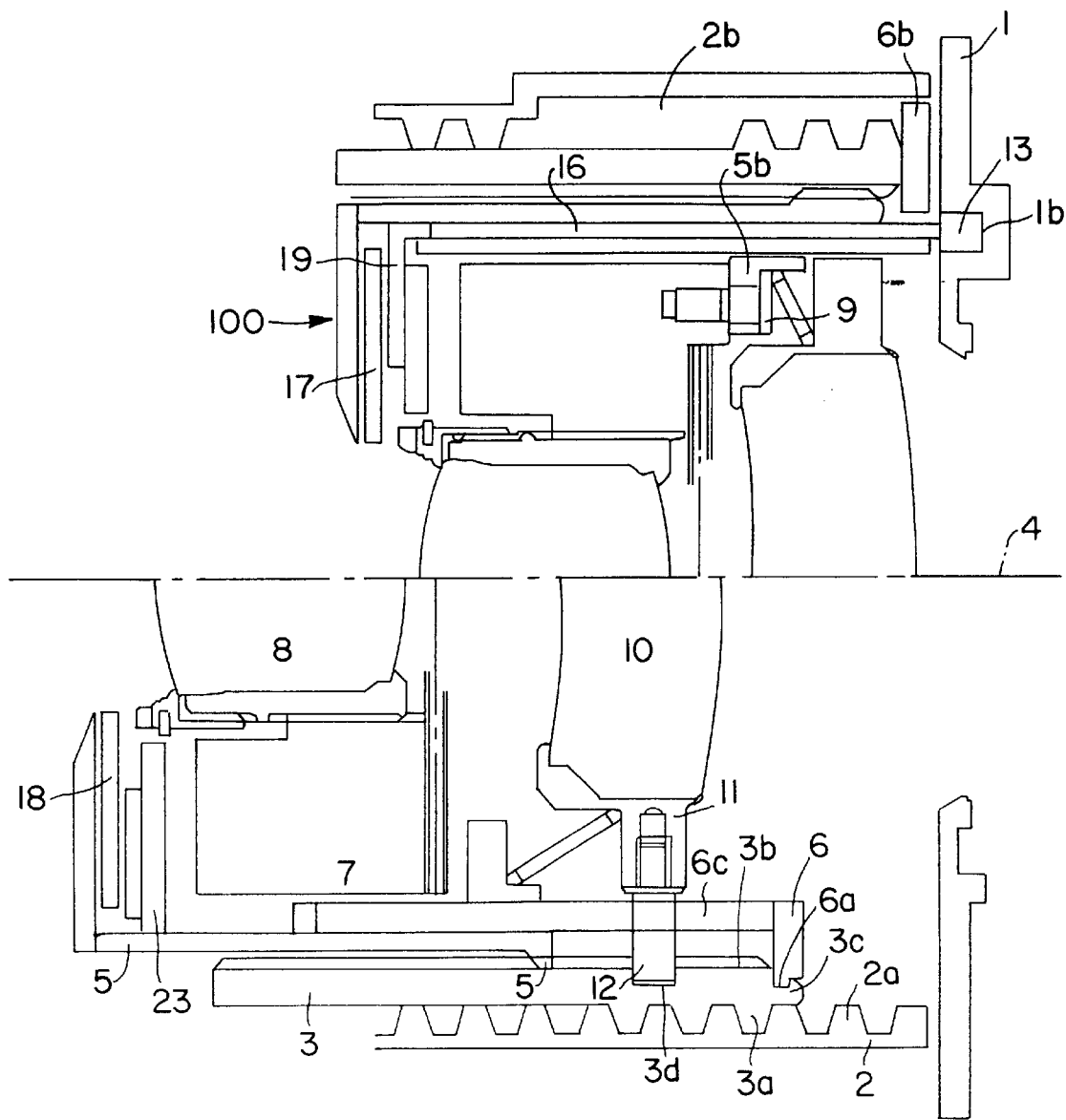
FIG. 2 is a cross-sectional diagram which illustrates the structure of a photographic lens unit for the embodiment of the camera of FIG. 1.

FIG. 1 illustrates a portion of a camera having a photographic lens unit according to a preferred embodiment of the present invention, and FIG. 2 is a cross-sectional view of the structure of a photographic lens unit for the embodiment of the camera illustrated in FIG. 1.

FIG. 1 illustrates the camera having a main switch knob 14 (also referred to as an operating member), disposed in a camera body 1, capable of an operation for photographic preparation (e.g., the camera is switched ON) and an operation for the conclusion of photography (e.g., the camera is switched OFF), and a photographic lens unit 100, which is driven to an extended position, in response to the operation of the main switch knob 14, for photographic preparation, and which is driven into a retracted position, more retracted into the camera body side than the extended position, in response to the operation for conclusion of photography.

The camera also comprises a lens barrier unit having lens barriers 17 and 18, capable of opening and closing between a closed position, in which the lens barriers 17 and 18 cover the front surface of a photographic lens 8 of photographic lens unit 100, and an open position, in which lens barriers 17 and 18 move clear of the front surface of the photographic lens 8.

An intermediate coupling member 16 (or barrier opening and closing member or simply member 16), which is a member separate from the main switch knob 14, drives the lens barriers 17 and 18 to an open position in response to the movement of the main switch knob 14 during operation for photographic preparation. The intermediate coupling member 16 also drives lens barriers 17 and 18 to a closed position by coupling to the movement of the photographic lens unit 100 when the photographic lens unit 100 moves from an extended position to a retracted position. Intermediate coupling member 16 is supported in a tube 6 of the photographic lens unit 100.

Intermediate coupling member 16 is guided in a guide groove 6d, formed in tube 6, and slides in the optical axis direction to drive the lens barriers 17 and 18 to the closed position or the open position by movement in the optical axis direction of the photographic lens unit 100.

Main switch knob 14, when used for the operation for photographic preparation and for the operation for conclusion of photography, moves in a direction perpendicular to the optical axis. Intermediate coupling member 16, by coupling to the movement of the main switch knob 14 when operated for photographic preparation, moves to camera body 1 side. Main switch knob 14 is operated above an aperture 1a, in a direction parallel to the long side of aperture 1a.

When the main switch knob 14 is operated for photographic preparation, the intermediate coupling member 16, which is a body separate from, and coupled to the movement of main switch knob 14, drives the lens barriers 17 and 18 into the open position, and, in addition, drives the photographic lens unit 100 into the extended position.

When the main switch knob 14 is operated for the conclusion of photography, the photographic lens unit 100 moves from the extended position to the retracted position, and in addition, the intermediate coupling member 16, by coupling to the movement of photographic lens unit 100, drives the lens barriers 17 and 18 to the closed position.

In FIG. 2, the photographic lens unit 100 comprising a zoom lens unit is illustrated. Optical axis 4 separates the diagram into an upper half portion and a lower half portion. The upper half portion shows the zoom lens unit positioned in the collapsed position (retracted position), and the lower half portion shows the zoom lens unit positioned in the wide angle position (extended position).

In FIG. 2, zoom lens unit 100 is supported in a fixed tube 2, fixed in camera body 1. By operation of the main switch knob 14, described below, the zoom lens unit 100 is capable of movement between the collapsed position (retracted position) shown in the upper half of FIG. 2, and the wide-angle end position (extended position) shown in the lower half of FIG. 2. Photography is prohibited in the collapsed position (e.g., when the camera is switched OFF), and is permitted in the wide angle end position (e.g., when the camera is switched ON). Also, by the operation of a zoom switch, not shown in the drawing, the zoom lens unit 100 can extend further than the wide angle position, as far as the telephoto position.

Further details of the zoom lens unit 100 are described below. As shown in FIG. 2, a movable tube 3 is inserted into the fixed tube 2. A male helicoid 3a, formed in the outer circumferential surface of the movable tube 3, is threaded to a female helicoid 2a, which is formed in the inner circumferential surface of the fixed tube 2. Accordingly, movement of the zoom lens unit in the optical axis direction is possible when the movable tube 3 rotates relative to the fixed tube 2. A female helicoid 3b and a cam groove 3d are formed in the inner circumferential surface of the movable tube 3.

A straight tube 6 is rotatably inserted into the movable tube 3, and is rotatable around the optical axis. Movement of the straight tube 6 in the optical axis direction is stopped with respect to movable tube 3 by the engagement of a hook 3c of movable tube 3 with a catch unit 6a of straight tube 6.

A rectilinear key 6b, which projects at the rear end portion of the straight tube 6, is in engagement with a straight groove 2b of the fixed tube 2, and by this means, the rotation of the straight tube 6 with respect to the fixed tube 2 is stopped. In other words, even if the movable tube 3 rotates, the straight tube 6 moves, without rotating, in the optical axis direction, together with the movable tube 3.

An inner tube 5 is inserted into the space between the movable tube 3 and the straight tube 6, and a male helicoid 5a, formed on its outer circumference, is in threaded engagement with the female helicoid 3b of the movable tube 3.

The inner tube 5 is supported to be capable of moving back and forth in the optical axis direction with respect to the straight tube 6, but the straight tube 6, by means of a mechanism not shown in the drawing, namely has its rotation made impossible with respect to the movable tube 3. Accordingly, when the movable tube 3 rotates, the inner tube 5 moves back and forth in the optical axis direction with respect to the straight tube 6, by means of the action of helicoids 5a and 3b.

A shutter 7 is attached by means of a screw 9 to a shutter stop portion 5b of the inner tube 5, and a first lens group 8 is supported by the shutter 7.

Also shown in FIG. 2, on the rearward side of the shutter 7, a second lens group holder 11 supports a second lens group 10 on the same axis as the first lens group 8. A cam follower 12, located in the second lens group holder 11, penetrates into a straight groove 6c formed in the optical axis direction in the straight tube 6, and is in engagement with a cam groove 3d of the movable tube 3.

By means of the movement of the cam groove 3d, accompanying the rotation of the cam tube 3, the cam follower 12 is driven in the optical axis direction, guided in the straight groove 6c, and, by this means, the second lens group 10 moves in the optical axis direction. During this movement, because the second lens group 10 moves at a different speed than the first lens group 8, which moves by means of the action of the helicoid, the focal length of the photographic lens changes.

The lens barrier unit comprising lens barriers 17 and 18 is located at the end of the inner tube 5. Lens barriers 17 and 18 are supported on a barrier base 23 and are rotatable between the closed position, shown in FIG. 3, and the open position shown in FIG. 1.

Figure 3:
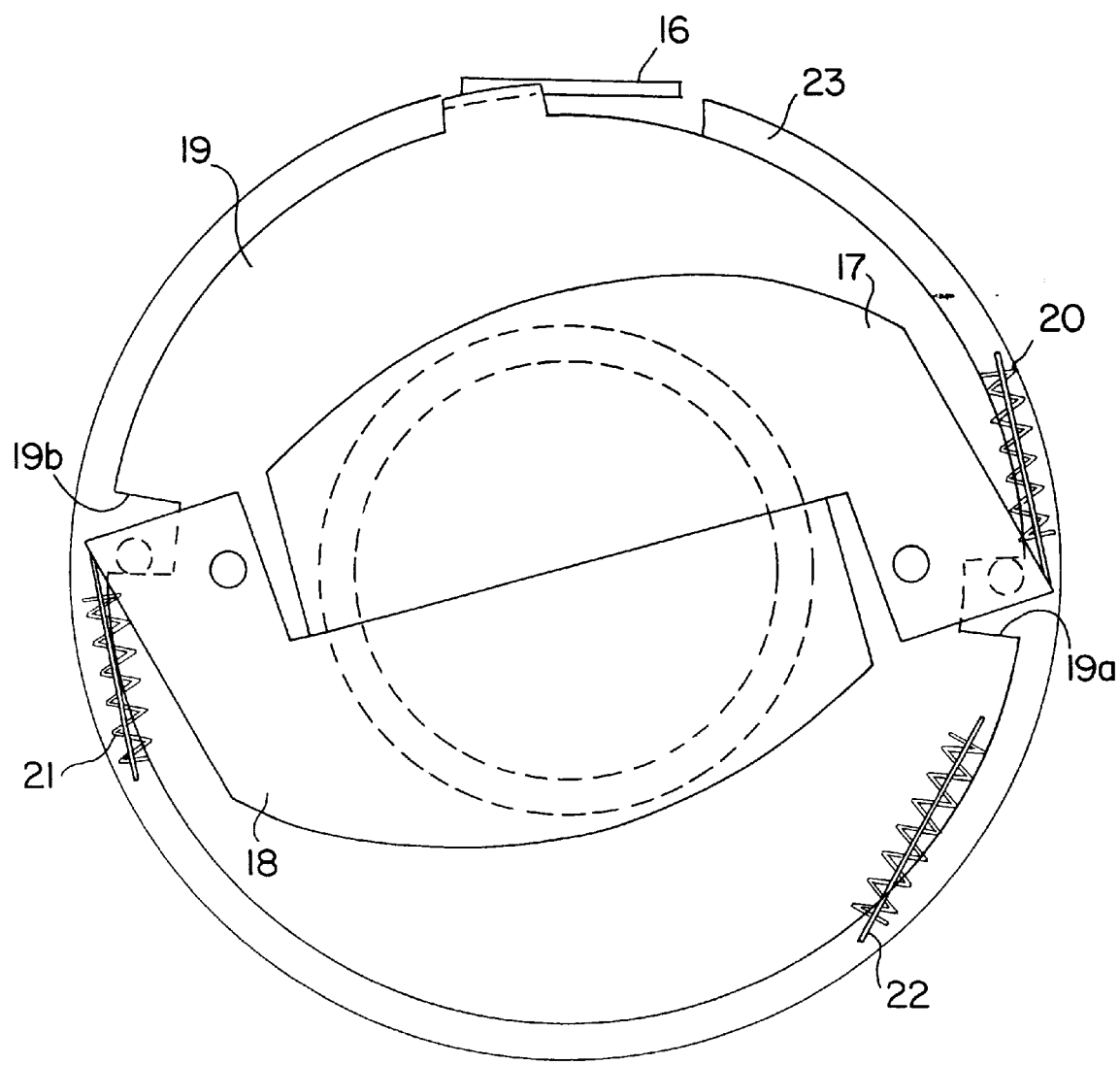
FIG. 3 is a front view showing the closed state of the lens barriers of a lens barrier unit for the embodiment of the camera of FIG. 1.

Lens barriers 17 and 18 are urged into the closed position by the barrier closing springs 20 and 21 as shown in FIG. 3. In the closed position, the front surface of the first lens group 8 is covered by barriers 17 and 18. In the open position, the barriers 17 and 18 move away from the front surface of the first lens group 8.

A rotary ring 19 for opening and closing the lens barrier unit is rotatably supported on the barrier base 23. The rotary ring 19 is urged in the clockwise direction in the drawing by means of a rotational ring biasing spring 22, of greater urging force than the barrier closing springs 20 and 21.

As shown in FIG. 1, pins 17a and 18a, projecting from lens barriers 17 and 18, are engaged in notches 19a and 19b disposed in the rotary ring 19. In FIG. 1, the pins 17a and 18a abut against the wall surface of the notches 19a and 19b and obstruct the rotation of the lens barriers 17 and 18 to the closed position.

When the rotary ring 19 rotates in the counter-clockwise direction shown in the drawing, because the pins 17a and 18a move away from the wall surfaces of the notches 19a and 19b, the lens barriers 17 and 18 rotate, due to the urging force of the springs 20 and 21, in a counter-clockwise direction to the closed position.

A lug 19c which projects in the optical axis direction from the rotary ring 19 is engaged with a notch 23a formed in the barrier base 23. The rotation of the rotary ring 19 in the clockwise direction and the counter-clockwise direction is regulated by means of the abutment of lug 19c on the wall surface of the notch 23a.

Figure 4:
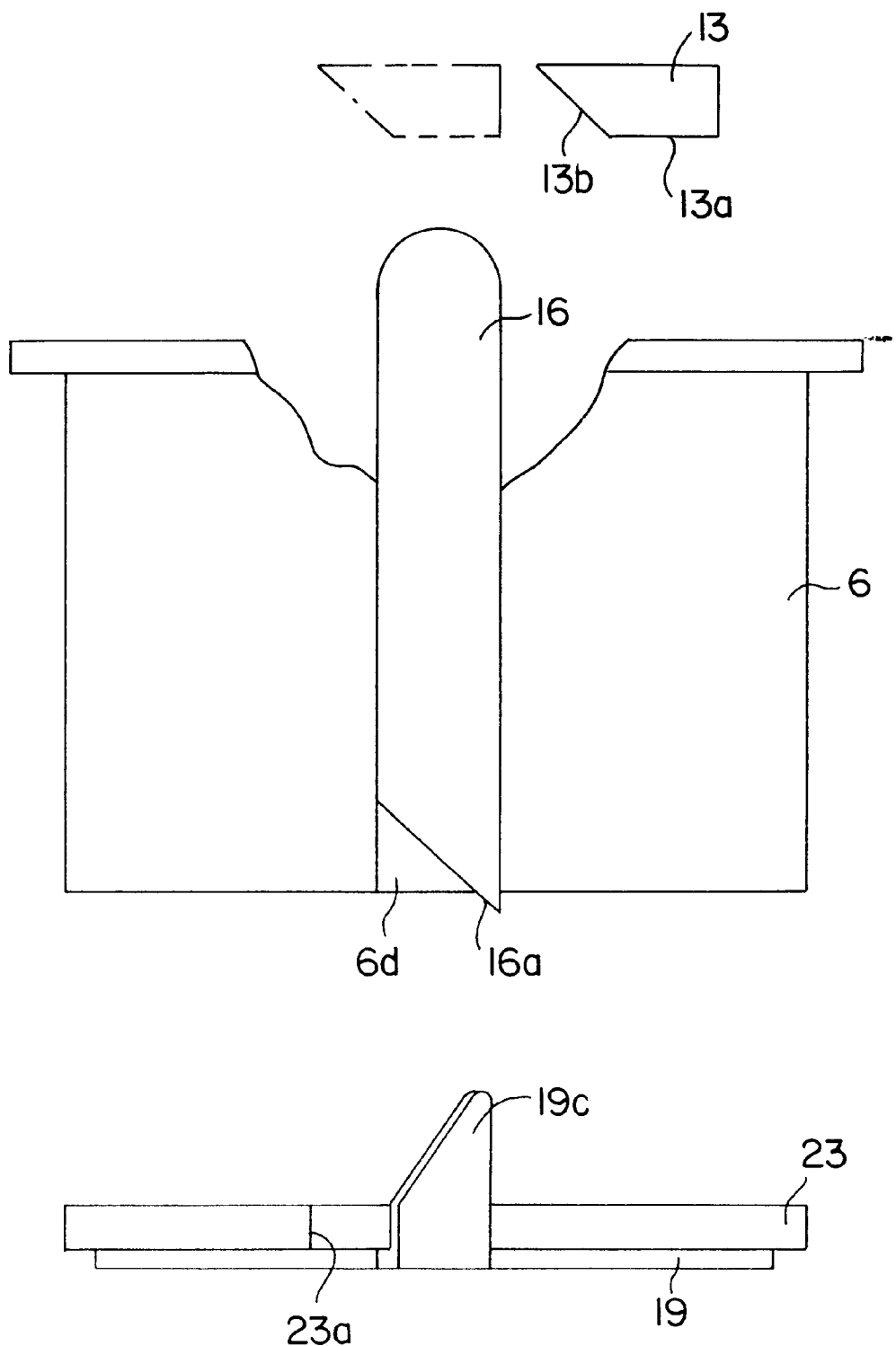
FIG. 4 is a diagram illustrating the opening and closing action of the intermediate coupling member of the present invention, when a zoom lens unit, in a preferred embodiment of the present invention, is in a wide angle end position.

As shown in FIG. 4, a barrier opening and closing member 16 is inserted into a guide groove 6d formed in the optical axis direction in the outer circumferential surface of the above-mentioned straight tube 6. The movement of the member 16 in the optical axis direction is guided by means of the wall surface and bottom surface of the groove 6d. An inclined surface portion 16a, which is capable of engagement with the lug 19c of the rotary ring 19, is formed at the front end of the barrier opening and closing member 16. A circular arcuate engagement portion 16b, capable of engagement with an abutment portion 13a and an inclined surface 13b of a driver 13, is formed on the rear end.

The driver 13, inserted into a groove 1b (FIG. 2) disposed in the upper portion of the aperture 1a of the camera body 1, is coupled to the main switch knob 14 via a coupling member. The main switch knob 14, partially exposed from the upper surface of the camera body, can be operated between an ON position and an OFF position, as shown in FIG. 1.

Coupled to the operation of the main switch knob 14, the driver 13 moves in a direction parallel to the long side of the aperture 1a. When the knob 14 is in the ON position or the OFF position, the driver 13 assumes the positions respectively shown by solid lines in FIGS. 4 and 5. Switch 15 is a main switch which is set ON and OFF, coupled to the operation of the main switch knob 14.

The operation of the camera according to the above preferred embodiment is described below.

Figure 5:
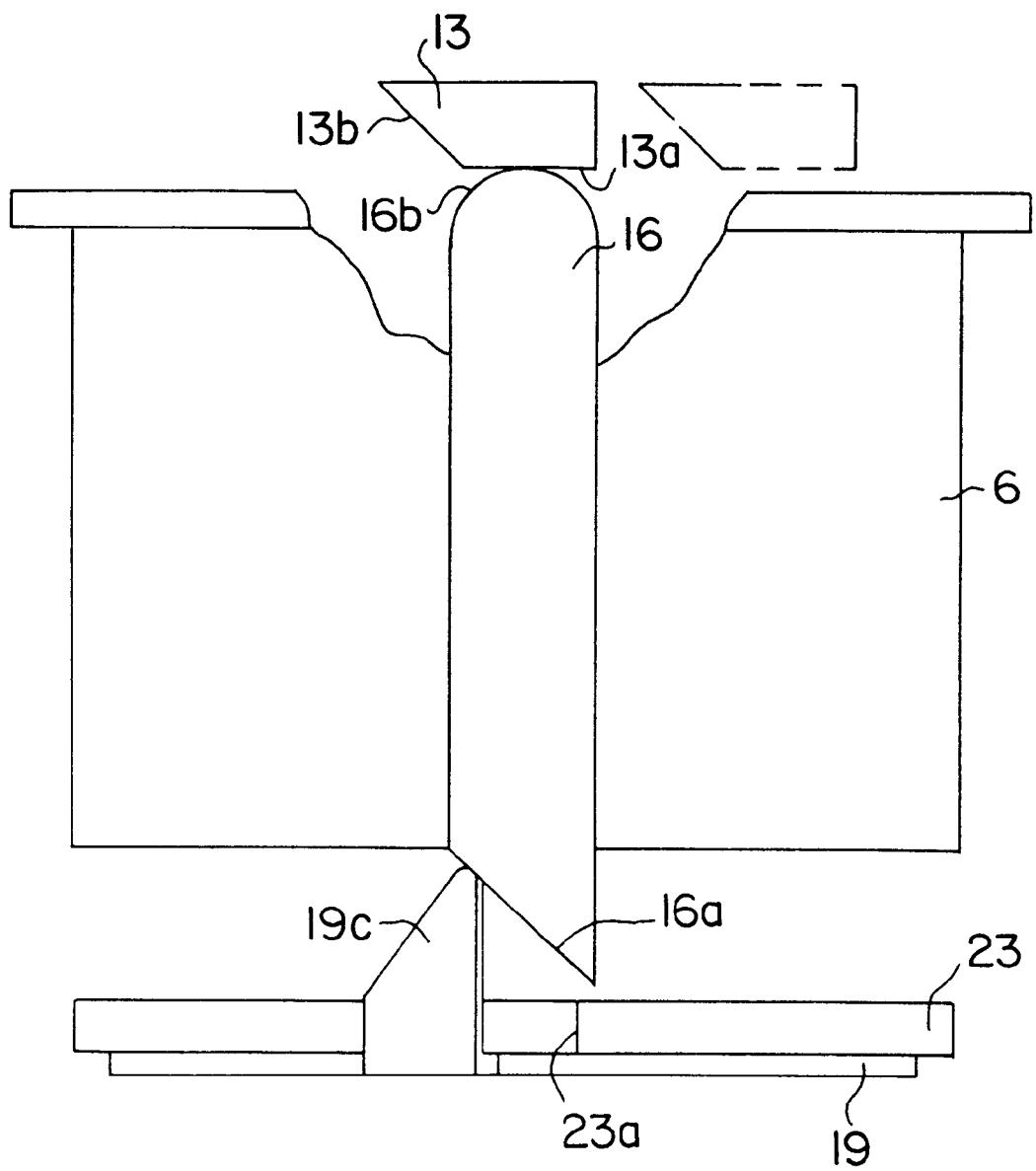
FIG. 5 is a diagram similar to FIG. 4, showing the state in which the zoom lens unit is in the collapsed position.

When the main switch knob 14 is in the OFF position, the main switch 15 is OFF, the zoom lens unit is in its collapsed position (the position shown in the upper half of FIG. 2), and the driver 13, the barrier opening and closing member 16, and the lug 19c of the rotary ring 19 are disposed as shown in FIG. 5. Namely, the engagement portion 16b of the barrier opening and closing member 16 abuts the abutment portion 13a of the driver 13, and the rearward movement of the member 16 is obstructed. In addition, the inclined surface portion 16a of the barrier opening and closing member 16 engages the lug 19c of the rotary ring 19, the rotary ring 19 is maintained in the state rotated counter-clockwise, and the lens barrier unit comprising lens barriers 17 and 18 is closed.

When the main switch knob 14 is operated from the OFF position to the ON position (when operated in preparation for photography), the driver 13 moves to the double dot chain line position of FIG. 5, the abutment portion 13a moves away from the path of movement of the barrier opening and closing member 16. By this means, because the barrier opening and closing member 16 is allowed to move rearwards, the rotary ring 19 is able to rotate in the clockwise direction.

Namely, while the inclined surface portion 16a of the member 16 and the abutting lug 19c move in the notch 23a, the rotary ring 19 rotates in a clockwise direction to the position of FIG. 1. By means of the rotation of the rotary ring 19, the wall surfaces of the notches 19a and 19b press against the pins 17a and 18a, and the lens barriers 17 and 18 rotate to the open position, in opposition to the urging force of the springs 20 and 21.

On the other hand, by the operation of the above-mentioned main switch knob 14 the ON position, the main switch 15 is set ON, a control device (not shown in the drawing) in the camera body turns the power supply ON, and in addition, drives a zoom motor, (not shown in the drawing), causing the movable tube 3 to rotate normally, to extend the zoom lens unit 100 in the optical axis direction.

Namely, while the movable tube 3 rotates, it extends in the optical axis direction, and the straight tube 6, not caused to rotate, is also extended together with movable tube 3. By means of the operation of the helicoids 3b, 5a, the inner tube 5, namely the first lens group 8, is extended with respect to the straight tube 6. Moreover, by means of the relative rotation of the movable tube 3 and the straight tube 6, the second lens group 10 moves in the optical axis direction by means of the action of the cam groove 3d, straight groove 6c, and cam follower 12.

When the zoom lens unit 100 reaches the wide angle position (the position shown in the bottom half of FIG. 2), the zoom motor is stopped. At this time, by means of the relative movement of the camera body 1, straight tube 6 and inner tube 5, the positional relationship of the driver 13, the barrier opening and closing lever 16, and lug 19c of the rotary ring 19 becomes as shown in FIG. 4.

After the wide angle position has been reached, according to operation of the zoom lens (not shown in the drawing), the zoom lens unit 100 can be optionally driven between the wide angle end position and a further extended telephoto end position, and photography is permitted at each position.

After the conclusion of photography, when the main switch knob 14 is operated from the ON position to the OFF position (the operation for conclusion of photography), as shown by the dashed line of FIG. 4, the abutment portion 13a of the driver 13 is inserted into the path of movement of the barrier opening and closing member 16, and in addition, the main switch 15 is set OFF. In response to the main switch 15 being set OFF, a control device of the camera body, driving the zoom motor, reverses the rotation of the movable tube 3, and, by means of the reverse of the above-mentioned operation, the zoom lens unit 100 is retracted.

At this time, the lens barrier unit comprising lens barriers 17 and 18 and the rotary ring 19, which were disposed in the inner tube 5, move back with respect to the barrier opening and closing member 16 which was supported in the straight tube 6, and the member 16 moves back with respect to the driver 13 disposed in the camera body 1.

On going past the wide angle position, the lug 19c of the rotary ring 19 abuts the inclined surface portion 16a of the member 16 and pushes the member 16 down and rearward, but on approaching the collapsed position, the engagement portion 16b of member 16 abuts the abutment portion 13a of the driver 13, and because moving back beyond this is obstructed, thereafter the oblique surface portion 16a of member 16, due to pressure exerted on the lug 19c, rotates the rotary ring 19 counter-clockwise in opposition to the urging force of the spring 22.

By means of this rotation of the rotary ring 19, because the wall surfaces of the notches 19a, 19b move away from the pins 17a, 18a, the lens barrier unit comprising lens barriers 17 and 18 rotates to the closed position due to the urging force of the springs 20, 21.

When the zoom lens unit 100 reaches the collapsed position, the zoom motor is stopped, and at this time the positional relationship of each member 13, 16, 19c becomes as shown in FIG. 5.

However, even though the main switch knob 14 is in the ON position, movement of the zoom lens unit 100 into the collapsed position can sometimes occur by means of erroneous operation and the like. In such a situation, the abutment portion 13a of the driver 13 moves back from the path of movement of member 16, and because member 16 is allowed to move back, the lens barrier unit comprising lens barriers 17 and 18 is still opened even at the collapsed position.

To remedy this situation, the main switch knob 14 may be again operated to the OFF position. Namely, because the oblique surface portion 13b is disposed on the driver 13, by means of the operation of the main switch knob 14 to the OFF position, the oblique surface portion 13b of the driver 13 pushes the barrier opening and closing member 16 out and forwards via the engagement portion 16b, and the lens barrier unit comprising lens barriers 17 and 18 can be closed by this means.

After this, if the main switch knob 14 is once more operated to the ON position, normal photography is again made possible.

By means of the above-described embodiment, because member 16 for opening and closing barriers 17 and 18 comprises a separate body from the main switch knob 14, in comparison with a structure in which the two are integral, bending exerts little effect, and even if member 16 becomes long, it is possible to drive member 16 by the desired amount with respect to the operation of the main switch knob 14.

Accordingly, even when high magnification lenses are used, the knob 14 and barrier opening and closing member 16 are not made thick, that is, the camera is not made larger, and opening and closing of the lens barrier unit comprising lens barriers 17 and 18 is reliably performed.

In the above-described embodiment, the main switch knob 14 constitutes the operating member, the zoom lens unit 100 constitutes the photographic lens unit, the barrier opening and closing member 16 (or member 16) constitutes the intermediate coupling member, and the straight tube 6 constitutes the tube.

It is recognized that the structure of the lens barrier unit or barrier opening and closing means (corresponding to the rotary ring), or of the intermediate coupling member, is not limited to the above-described embodiment. Moreover, the above description refers to a camera equipped with a zoom lens, but, for example, the invention can also be suitable for a single focus camera capable of extending/retracting between a collapsing device, and a device capable of photography, or for a two-focus camera using a lens which can be disposed in a wide angle position and a telephoto position.

According to the above embodiments of the present invention, because the operating member is a separate body from the opening and closing operating member (intermediate coupling member), which opens and closes the lens barrier unit, the effect of bending is diminished in comparison with a structure in which the two members are integral, and even if the intermediate coupling member becomes long, the intermediate coupling member can be driven by the desired amount with respect to the operation of the operating member.

Accordingly, even when a high magnification lens is used, the operating member and the intermediate coupling member are not made thick. In other words, opening and closing of the lens barrier unit can be reliably performed without an increase of the size of the camera.

According to the above embodiments of the camera according to the present invention, the intermediate coupling member is supported in a tube of the photographic lens unit, and bending of the intermediate coupling member is suppressed, and opening and closing of the lens barriers is more reliably performed.

In particular, if a guide groove is disposed in the tube to guide the movement of the intermediate coupling member, the intermediate coupling member can reliably move in response to the extent of operation of the operating member, even if the stroke of the intermediate coupling member is made long.

Furthermore, in accordance with the above embodiments of the present invention, if the operating member moves in the optical axis direction of the photographic lens, the stroke of the operating member is sufficiently maintained without making the diameter of the photographic lens unit large.

To the contrary, if the operating member is made to operate in a direction parallel to the short side of the aperture, in the side of the aperture, a stroke of the operating member is not sufficiently maintained, and operation can be obstructed. But if the operating member has the structure according to the embodiments of the present invention, and operates in a direction parallel to the long side of the aperture, the stroke of the operating member is sufficiently maintained.

Figure 6:
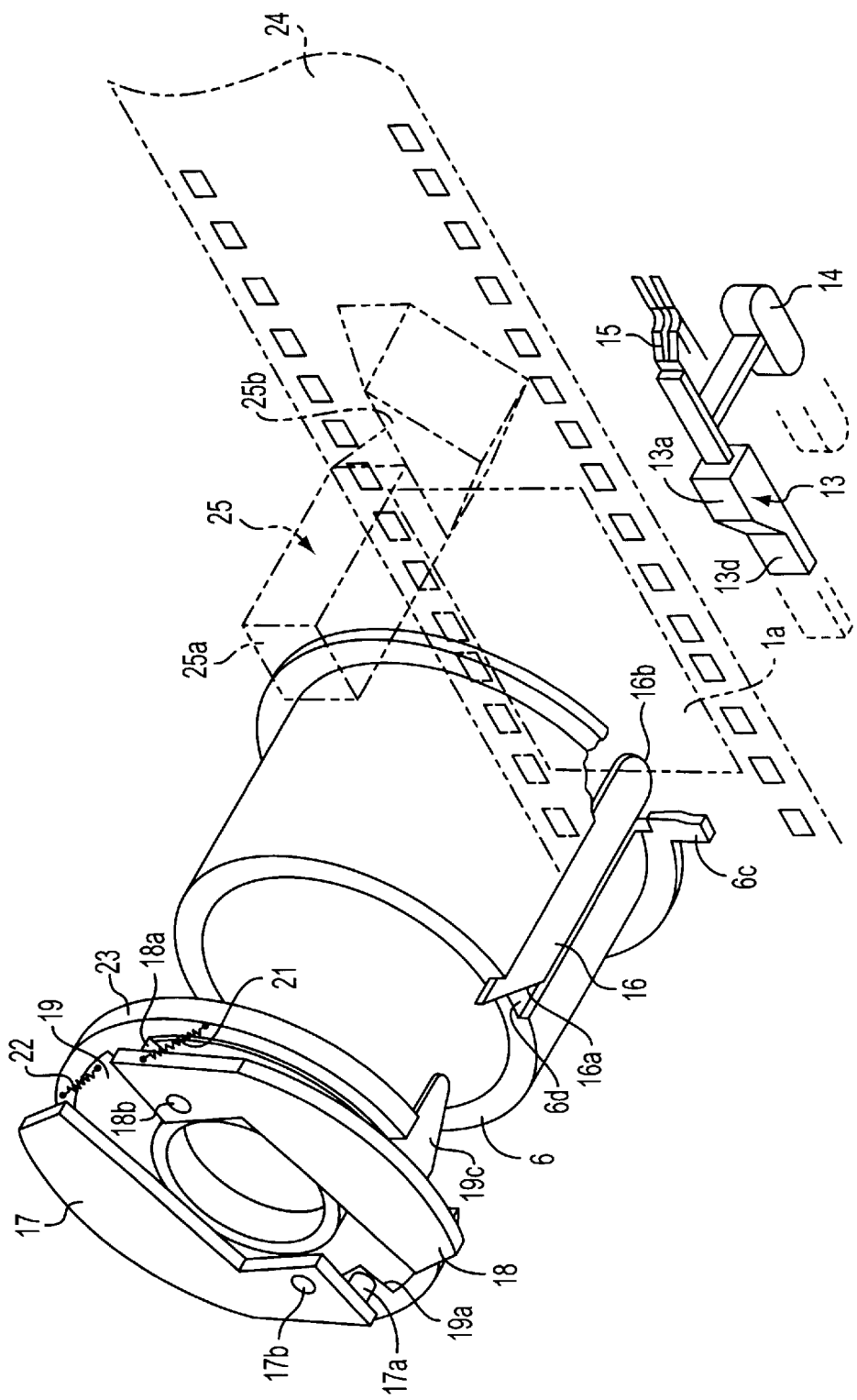
FIG. 6 is a perspective view showing a second embodiment of a barrier opening/closing camera according to the present invention.
Figure 7:
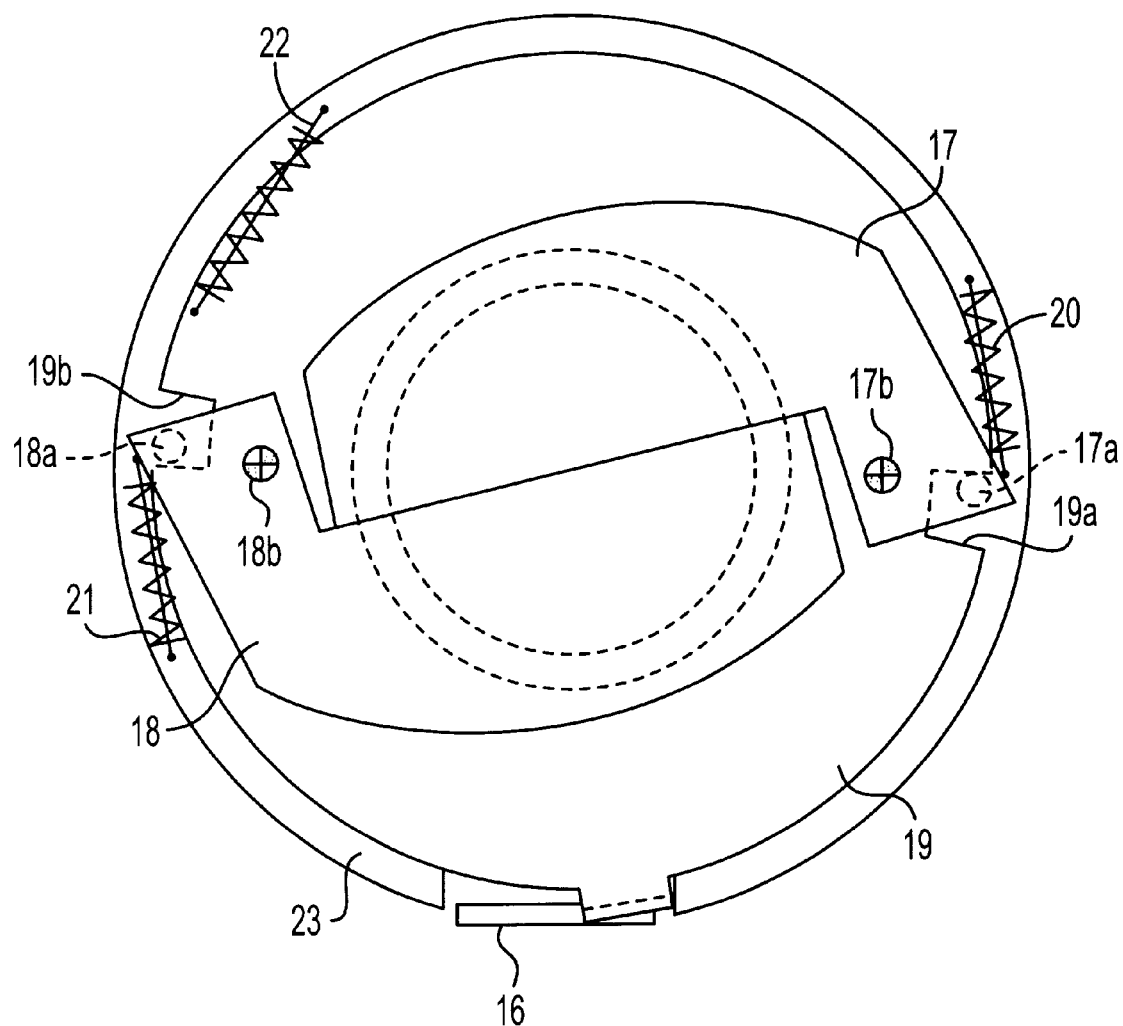
FIG. 7 is an explanatory view showing a state where lens barriers are closed in accordance with the second embodiment of the barrier opening/closing camera of the present invention.

A lens barrier unit in accordance with a second embodiment of the present invention will now be described below. The same or similar elements in the first and second embodiments will be referred to by like reference numerals. FIG. 6 is a perspective view showing a barrier opening/closing camera in accordance with the second embodiment of the present invention. FIG. 7 is an explanatory view showing a state where a lens barrier is closed as viewed from a lens-side for explanatory convenience.

Referring first to FIG. 6, light beams from an object pass through an unillustrated photographing lens and arrive on a film aperture 1a, thereby photo-sensitizing a film 24. A finder 25 is disposed upwardly of the film 24. Provided downwardly of the film 24 are a barrier opening/closing member 16 and a moving member 13 interlocking with a main switch knob 14. The main switch knob 14 is movable to ON- and OFF-positions, and a main switch 15 detects a position of the main switch knob 14. When the main switch knob 14 is switched from the OFF-position to the ON-position, an unillustrated control device switches ON a power supply of the camera, whereby the lens barrel assuming a collapsible state is extended to a wide-angle position by an unillustrated driving device. Further, when the main switch knob 14 is switched from the ON-position to the OFF-position, the unillustrated control device switches OFF the power supply of the camera, whereby the lens barrel set in an arbitrary possible-of-photographing position by a camera user is retracted to a collapsible position by the unillustrated driving device.

The lens barrier opening/closing member (corresponding to an intermediate coupling member) 16 is so fitted in a flat portion, i.e., a guide groove 6d, of a rectilinear movement drum or straight tube 6 as to be movable in an optical-axis direction. Attached to a front portion of the rectilinear movement drum 6 is a lens barrier unit comprising lens barriers 17, 18, a rotary ring 19, barrier closing springs 20, 21 (see FIG. 7), a rotational ring biasing spring 22, and a barrier base 23. The lens barriers 17, 18 are so fitted to the barrier base 23 as to be rotatable about shafts 17b, 18b, respectively. The barriers 17, 18 are biased by the barrier closing springs 20, 21 (FIG. 7) in closing directions.

The rotational ring 19 is rotatably attached to the barrier base 23, and notched portions 19a, 19b formed in the rotational ring 19 respectively engage with pins 17a, 18a provided on the barriers 17, 18. Referring again to FIG. 6, when the rotational ring 19 rotates, the notched portions 19a, 19b engage with the pins 17a, 18a, with the result that the barriers 17, 18 are driven by the rotational ring 19. The barriers 17, 18 can be thereby rotated to open and close.

The rotational ring 19 is biased by a rotational ring biasing spring 22 having a larger spring force than the lens barrier closing springs 20, 21, and the lens barriers 17, 18 normally remain open. When the rotational ring 19 is rotated in a direction opposite to the biasing direction of the rotational ring biasing spring 22, the barriers 17, 18 are closed.

Figure 8:
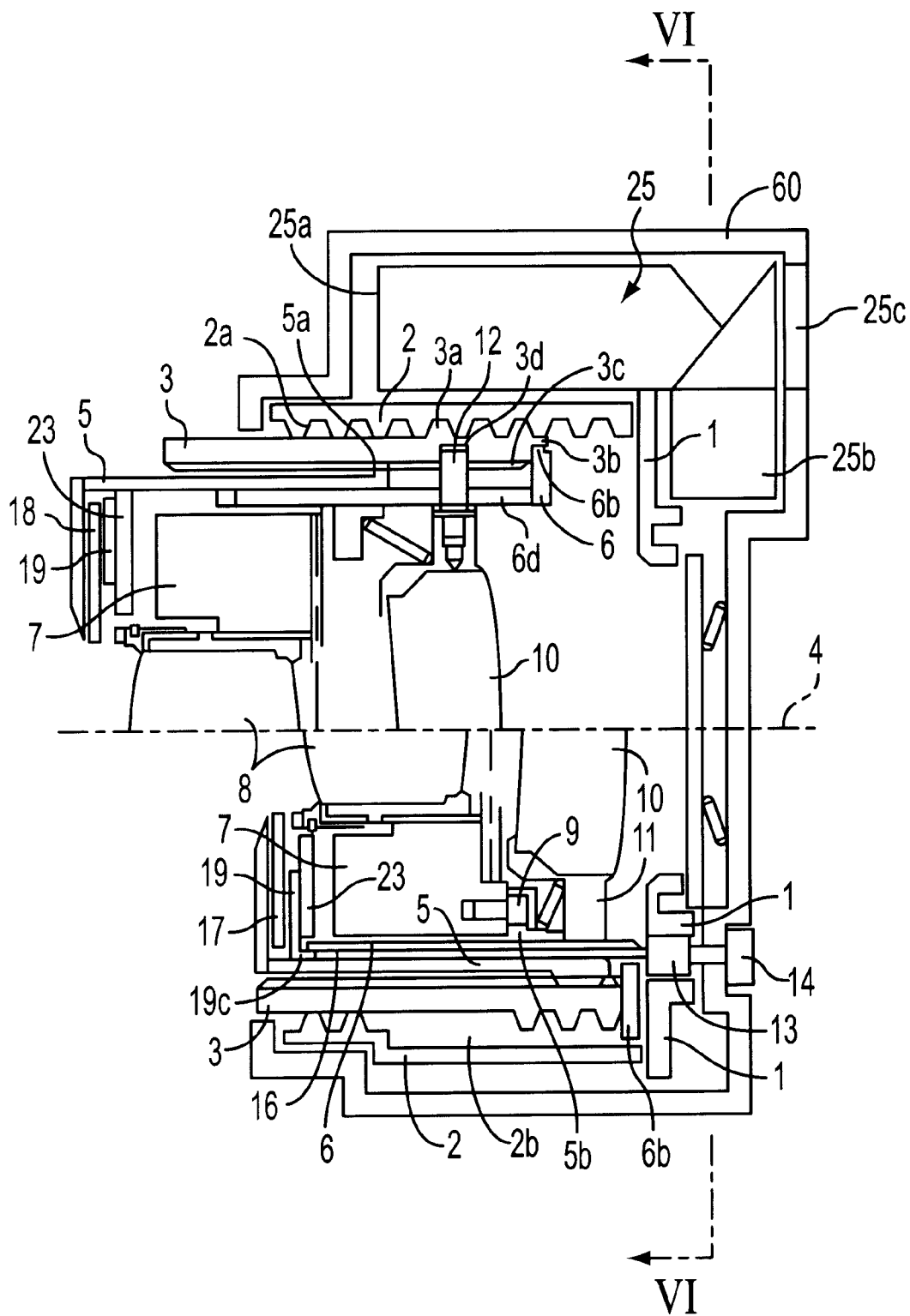
FIG. 8 is a sectional view showing the second embodiment of the barrier opening/closing camera of the present invention.

FIG. 8 is a sectional view of the lens barrel in accordance with the second embodiment, wherein a lower half thereof shows the collapsible state (a housed position), while an upper half thereof shows a wide-angle photographing position (a possible-of-photographing position). Referring to FIG. 8, the numeral 60 represents an outer cover.

Referring again to FIG. 8, the finder 25 comprises an objective lens element 25a, a prism element 25b and an eyepiece element 25c. A camera body 1 is fitted with a fixed drum 2 an internal periphery of which is formed with a female helicoid 2a. A male helicoid 3a formed on a movable drum 3 is helicoid-fitted in the female helicoid 2a. The movable drum 3 is movable along an optical axis 4 while rotating with respect to the fixed drum 2.

A pawl 3c formed at a rear end of the movable drum 3 engages with a pawl engaging portion 6a of the rectilinear movement drum 6, and the rectilinear movement drum 6 is relatively rotatable with respect to the movable drum 3. The rectilinear movement drum 6 is formed with a rectilinear movement key 6b which is so engaged with a rectilinear movement keyway 2b of the fixed drum 2 as to be movable along the optical axis 4. Even when the movable drum 3 rotates with respect to the fixed drum 2, the rectilinear movement drum 6 only moves together with the movable drum 3 along the optical axis 4. A female helicoid 3c formed in an internal periphery of the movable drum 3 is helicoid-engaged with a male helicoid 5a formed on a first-unit drum 5. The first-unit drum 5 is extendable and retractable in the optical-axis direction with respect to the rectilinear movement drum 6 but prevented from being rotated.

A first lens group 8 is fitted to a shutter 7 fastened to a shutter stopper portion 5b of the first-unit drum 5 with a screw 9. A second lens group 10 is mounted in a second lens group holder 11, and a cam follower pin 12 is secured to the second lens group holder 11. The cam follower 12 is fitted in a cam groove 3d formed in an internal periphery of the movable drum 3 and also inserted in a rectilinear movement groove 6d formed in the rectilinear movement drum 6.

The lens barrel operates such that the movable drum 3 rotates and thus moves rectilinearly along the optical axis 4 with respect to the fixed drum 2 while keeping its rotations. Then, with the movement of the movable drum 3, the rectilinear movement drum 6 makes only the rectilinear movement along the optical axis 4.

Subsequently, with a rotating force of the movable drum 3 and a restriction of the rectilinear movement of the rectilinear movement drum 6, the first-unit drum 5 is extended out of the movable drum 3. Further, with the relative rotations of the movable drum 3 to the rectilinear movement drum 6, the second lens group 10 is cam-moved in the optical-axis direction with the aid of the cam groove 3d of the movable drum 3 and the rectilinear movement groove 6d of the rectilinear movement drum 6.

Next, lens barrier opening/closing operations will be explained. FIGS. 9 and 10 are views to assist in explaining the barrier opening/closing operations interlocking with the lens operations. FIG. 9 shows a collapsible state. FIG. 10 shows a wide-angle state. FIGS. 9 and 10 are views of the lens barrier opening/closing member 16 as viewed from above for an explanatory convenience.

When the main switch knob 14 is in the OFF-position, as illustrated in FIG. 9, the lens barrel stops in a collapsible position, and a protruded portion 13a of the moving member 13 interlocking with the main switch knob 14 remains stationary on a movement line (shown by an alternate long and short dashed line) 36 of the barrier opening/closing member 16 and engages with an engagement portion 16b of the barrier opening/closing member 16. At this time, the lens barrier opening/closing member 16 is hindered from being retracted (moved in the upper direction in FIG. 9) by the protruded portion 13a and brought into such a state as to protrude (in the downward direction in FIG. 9) forward from the rectilinear movement drum 6. An inclined surface portion 16a formed at the front edge of the barrier opening/closing member 16 thrusts a lug 19c of the rotational ring 19, and the rotational ring 19 is held so that the rotational ring 19 is rotated in the direction (left direction in FIG. 9) opposite to the biasing direction of the rotational ring biasing spring 22, thus keeping the barriers 17, 18 in the closed state.

When the main switch knob 14 is shifted from the OFF-position to the ON-position, as illustrated in FIG. 10, the protruded portion 13a of the moving member 13 interlocking with the main switch knob 14 retracts (moves in the right direction in FIG. 10) off the movement line (shown by the alternate long and short dashed line) 36 of the lens barrier opening/closing lever 16. The lens barrier opening/closing lever 16 that is hindering the rotation of the rotational ring 19 is thrust and retracted (moved upwards in FIG. 10) by the lug 19c and the rotational ring 19 is rotated, thereby opening the lens barriers 17, 18. Almost simultaneously when the lens barriers 17, 18 open, as explained in FIG. 6, the lens barrel is extended to the wide-angle position.

When the main switch knob 14 is shifted from the ON-position to the OFF-position, the protruded portion 13a of the moving member 13 interlocking with the main switch knob 14 is inserted on the movement line (shown by the alternate long and short dashed line) 36 of the lens barrier opening/closing member 16. The lens barrel is, as described above, retracted from the extended position, and the lug portion 19c pushes the barrier opening/closing member 16 backward. Then, when the lens barrel is further retracted, the protruded portion 13a of the moving member 13 hinders the barrier opening/closing member 16 from retreating, and it follows that the inclined surface portion 16a thrusts the lug portion 19c. Then, the rotational ring 19 rotates, thereby closing the lens barriers 17, 18.

Figure 11:
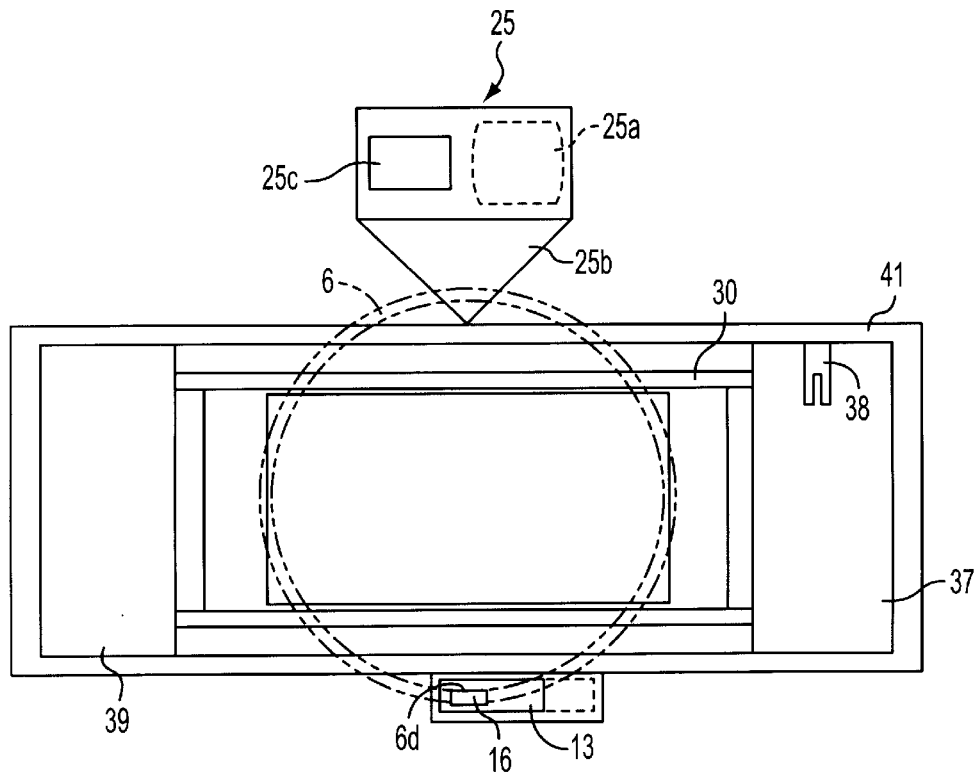
FIG. 11 is a sectional view taken along the line VI—VI in FIG. 8.
Figure 12:
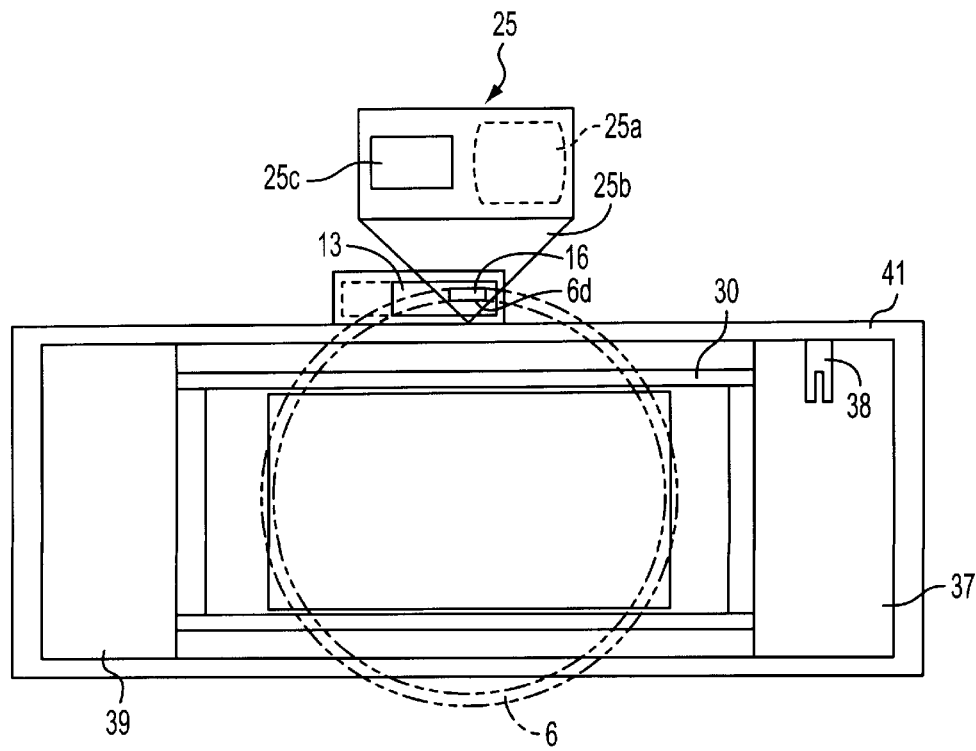
FIG. 12 is a sectional view illustrating an imaginary example of the barrier opening/closing camera.

FIG. 11 is a sectional view taken along the line VI—VI in FIG. 8. Shown therein are a film cartridge chamber 37, a fork 38, a spool chamber 39, an internal rail surface 30, and an external rail surface 41. The lens barrier opening/closing member 16 is provided in the guide groove 6d of the rectilinear movement drum 6. The lens barrier opening/closing member 16 is—because of being provided in the guide groove 6d of the rectilinear movement drum 6, though considered to be provided in another position if within an alternate long and two short dashed line in FIG. 11—impossible of disposition within a range of the external rail 41 due to a passage of the film. Further, the lens barrier opening/closing member 16 is also impossible to being dispose in the vicinity of a circumferential uppermost position of the rectilinear movement drum 6 due to an interference with the finder 25 shown in FIG. 12. Accordingly, an optimal disposition thereof is in the vicinity of a circumferential lowermost position shown in FIG. 12.

Thus, the barrier opening/closing member 16 is disposed in the vicinity of the circumferential lowermost position of the rectilinear movement drum 6, thereby facilitating the dispositions of the lens barrier opening/closing mechanism and the finder member without increasing the size of the camera. Further, when a flexible substrate of the shutter is connected to the camera body from the lens barrel in a zoom lens camera, etc., it is preferable that the flexible substrate for preventing a reflection of the light be disposed upwardly of the lens barrel. Hence, there is obtained such an effect that the lens barrier opening/closing member 16 is provided under the lens barrel, whereby the flexible substrate does not interfere with the lens barrier opening/closing member 16.

FIGS. 13 through 16 are a perspective view, a vertical-sectional view and a rear view, respectively, that illustrate a third embodiment of a lens barrier opening/closing camera according to the present invention. Elements shown in FIGS. 13 through 16 which are the same as or similar to the elements shown in FIGS. 1–12 are referred to by the same reference numerals.

Figure 13:
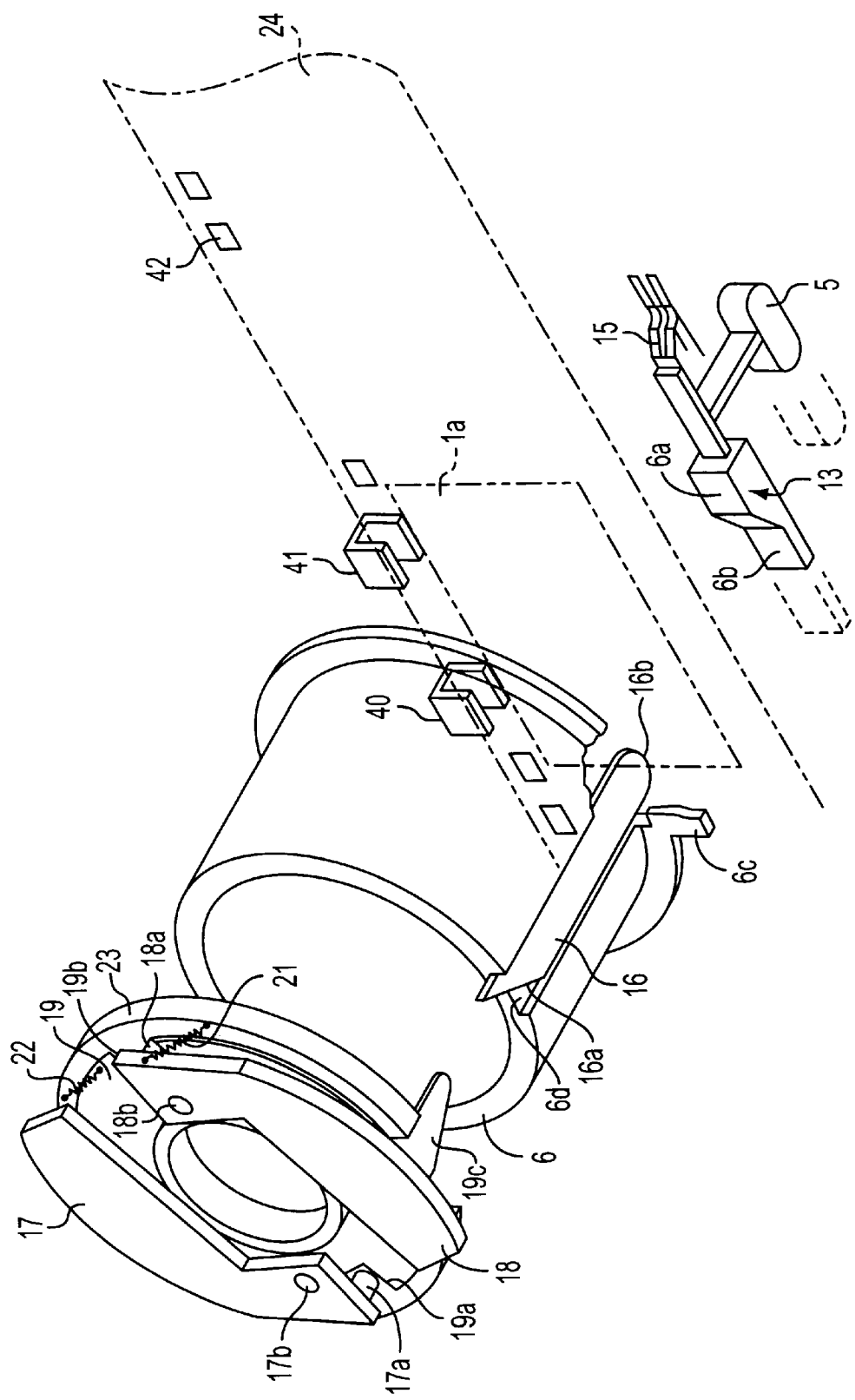
FIG. 13 is a perspective view showing a third embodiment of the barrier opening/closing camera of the present invention.

Referring first to FIG. 13, the light beams from the object pass through the unillustrated photographing lens and arrive on the film aperture 1a, thereby photo sensitizing the film 24. Photo interrupters 40, 41 are disposed upwardly of the film 24, and a feed quantity of the film 24 is detected by detecting perforations 42 formed in the film 24. The lens barrier opening/closing member 16 and the moving member 13 interlocking with the main switch knob 14 are provided on the side opposite (downward in FIG. 13) to the photo interrupters 40, 41. The main switch knob 14 is shiftable to the ON- and OFF-positions, and a position of the main switch knob 14 is detected by the switch 15. When the main switch knob 14 is switched from the OFF-position to the ON-position, the unillustrated control device switches ON the power supply of the camera, whereby the lens barrel assuming the collapsible state is extended to the wide-angle position by the unillustrated driving device. Further, when the main switch knob 14 is switched from the ON-position to the OFF-position, the unillustrated control device switches OFF the power supply of the camera, whereby the lens barrel set in an arbitrary possible-of-photographing position by the camera user is retracted to the collapsible position by the unillustrated driving device.

The lens barrier opening/closing member (corresponding to the-intermediate interlocking member) 16 is so fitted in the guide groove 6d of the rectilinear movement drum 6 as to be slidable in the optical-axis direction. Attached to the front portion of the rectilinear movement drum 6 are the lens barrier unit comprising the barriers 17, 18, the rotational ring 19, the barrier closing springs 20, 21 (not shown), the rotational ring biasing spring 22, and the barrier base 23. The barriers 17, 18 are rotatably fitted to the barrier base 23. The barriers 17, 18 are biased by the barrier closing springs 20, 21 in closing directions. The rotational ring 19 is rotatably attached to the barrier base 23, and the notched portions 19a, 19b formed in the rotational ring 19 engage with pins 17a, 18a provided on the barriers 17, 18. When the rotational ring 19 rotates clockwise (counterclockwise), the notched portions 19a, 19b respectively engage with the pins 17a, 18a, with the result that the barriers 17, 18, can be closed (opened). The rotational ring 19 is biased by the rotational ring biasing spring 22 having the larger spring force than the barrier closing springs 20, 21, and the barriers 17, 18 normally remain open. When the rotational ring 19 is rotated in the direction opposite to the biasing direction of the rotational ring biasing spring 22, the barriers 17, 18 are closed.

The following is an operation of how the barriers open and close. When the main switch knob 14 is in the OFF-position, the lens barrel stops in the collapsible position, and the protruded portion 13a of the moving member 13 interlocking with the main switch knob 14 remains stationary on the movement line of the barrier opening/closing member 16. At this time, the barrier opening/closing member 16 is hindered from being retreated (in the right direction in FIG. 13) by the protruded portion 13a and brought into such a state as to protrude (in the left direction in FIG. 13) forward. The inclined portion 16a formed at the front edge of the lens barrier opening/closing lever 16 thrusts the lug portion 19c of the rotational ring 19, and the rotational ring 19 is held so that the rotational ring 19 is rotated in the direction opposite to the biasing direction of the rotational ring biasing spring 22, thus keeping the barriers 17, 18 in the closed state.

When the main switch knob 14 is shifted from the OFF-position to the ON-position, the protruded portion 13a of the moving member 13 interlocking with the main switch knob 14 retreats off the movement line of the barrier opening/closing lever 16. The barrier opening/closing lever 16 that is hindering the rotation of the rotational ring 19 is thrust and retracted (in the right direction in FIG. 13) by the lug portion 19c, and the rotational ring 19 is rotated counterclockwise, thereby opening the barriers 17, 18. Almost simultaneously when the barriers 17, 18 open, the lens barrel is extended to the wide-angle position in the same way as the above-mentioned.

When the main switch knob 14 is shifted from the ON-position to the OFF-position, the protruded portion 13a of the moving member 13 interlocking with the main switch knob 14 is inserted on the movement line of the barrier opening/closing member 16. The lens barrel is retracted from the extended position, and the lug portion 19c pushes in the barrier opening/closing lever 16 backward (in the right direction in FIG. 13). Then, when further retracted, the protruded portion 13a of the moving member 13 hinders the lens barrier opening/closing member 16 from retreating, and it follows that the inclined portion 16a thrusts the lug portion 19c. Then, the rotational ring rotates clockwise, thereby closing the barriers 17, 18.

Figure 14:
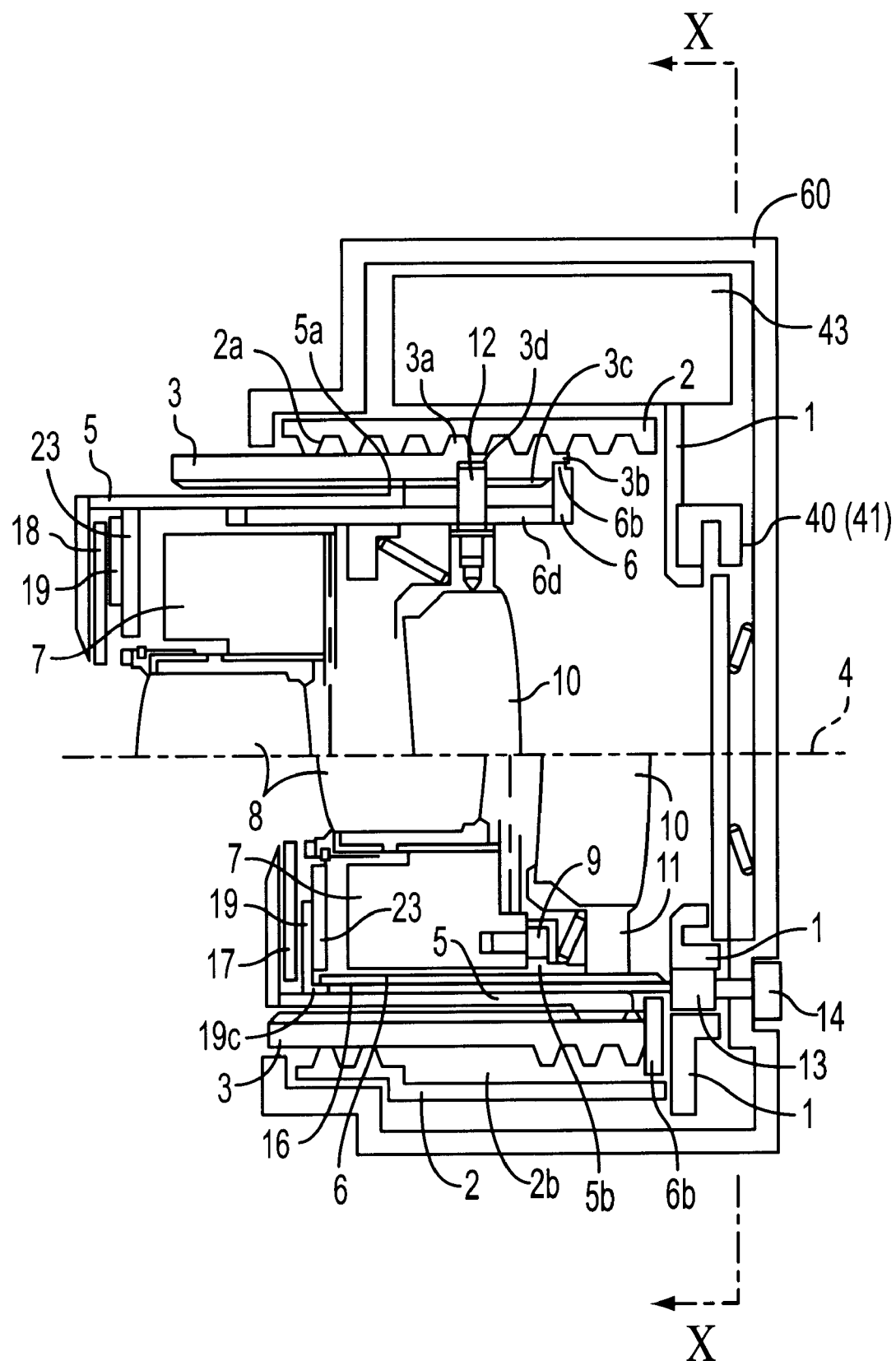
FIG. 14 is a sectional view showing the third embodiment of the barrier opening/closing camera of the present invention.

FIG. 14 is a sectional view of the lens barrel in accordance with the third embodiment of the present invention, wherein a lower half thereof shows the collapsible state (the housed position), while an upper half thereof shows the wide-angle photographing position (the possible-of-photographing position). Note that the explanatory view (FIG. 7) showing the state where the lens barriers are closed and the explanatory views (FIGS. 9 and 10) each showing the lens operation, are the same as those in the first and second embodiments, and the repetitive explanations are herein omitted.

Referring to FIG. 14, the operation of the lens barrel will be explained. The numeral 60 represents the outer cover. The camera body 1 is fitted with the fixed drum 2 the internal periphery of which is formed with the female helicoid 2a. The male helicoid 3a formed on a movable drum 3 is helicoid-fitted in the female helicoid 2a. The movable drum 3 is movable along the optical axis 4 while rotating with respect to the fixed drum 2.

The pawl 3b formed at the rear end of the movable drum 3 engages with the pawl engaging portion 6b of the rectilinear movement drum 6, and the rectilinear movement drum 6 is relatively rotatable with respect to the movable drum 3. The rectilinear movement drum 6 is formed with the rectilinear movement key 6b which is so engaged with the rectilinear movement keyway 2b of the fixed drum 2 as to be movable along the optical axis 4. Even when the movable drum 3 rotates with respect to the fixed drum 2, the rectilinear movement drum 8 only moves together with the movable drum 3 along the optical axis.

The female helicoid 3c formed in the internal periphery of the movable drum 3 is helicoid-engaged with the male helicoid 2a formed on the first-unit drum 5. The first-unit drum 5 is extendable and retractable in the optical-axis direction with respect to the rectilinear movement drum 6 but prevented from being rotated.

The first lens group 8 is fitted to the shutter 7 fastened to the shutter stopper portion 5b of the first unit drum 5 with a screw 9. A second lens group 10 is mounted in the second lens group holder 11, and the cam follower pin 12 is secured to the second lens group holder 11. The cam follower pin 12 is fitted in the cam groove 3d formed in the internal periphery of the movable drum 3 and also inserted in the rectilinear movement groove 6d formed in the rectilinear movement drum 6.

The lens barrel operates such that the movable drum 3 rotates and thus moves rectilinearly along the optical-axis 4 with respect to the fixed drum 2 while keeping its rotations. With the movement of the movable drum 3, the rectilinear movement drum 6 makes only the rectilinear movement along the optical-axis. With the rotating force of the movable drum 3 and the restriction of the rectilinear movement of the rectilinear movement drum 6, the first-unit drum 5 is extended out of the movable drum 3. Further, with the relative rotations of the movable drum 3 to the rectilinear movement drum 6, the second lens group 10 is cam-moved in the optical-axis direction with the aid of the cam groove 3d of the movable drum 3 and the rectilinear movement groove 6d of the rectilinear movement drum 6.

Figure 15:
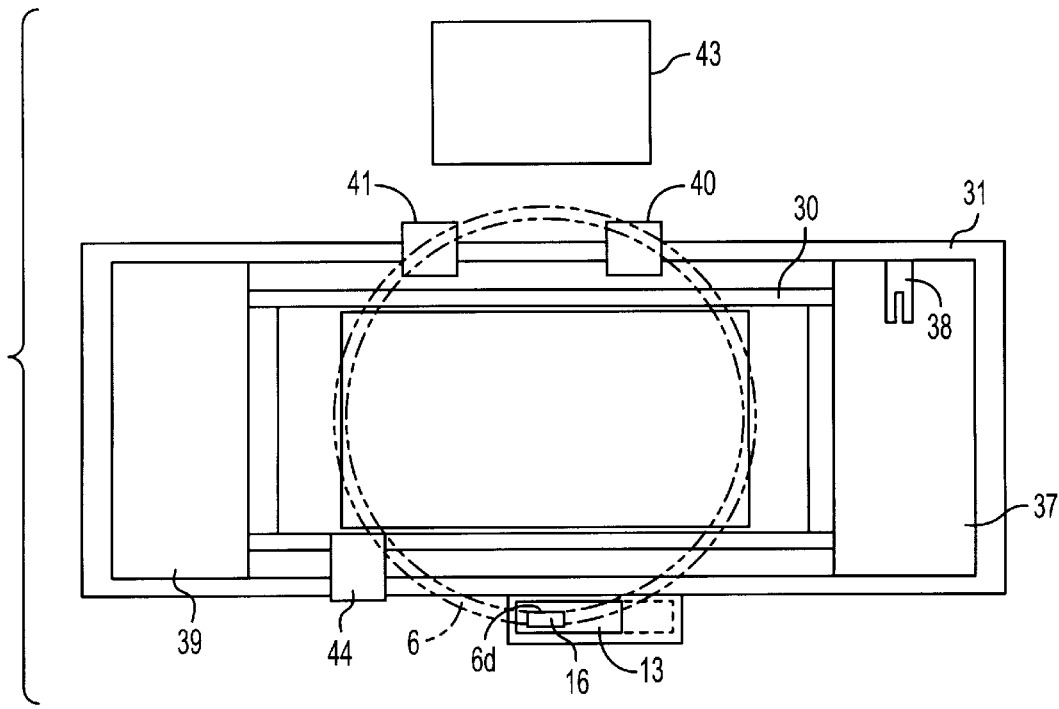
FIG. 15 is a sectional view taken along the line X—X in FIG. 14.
Figure 16:
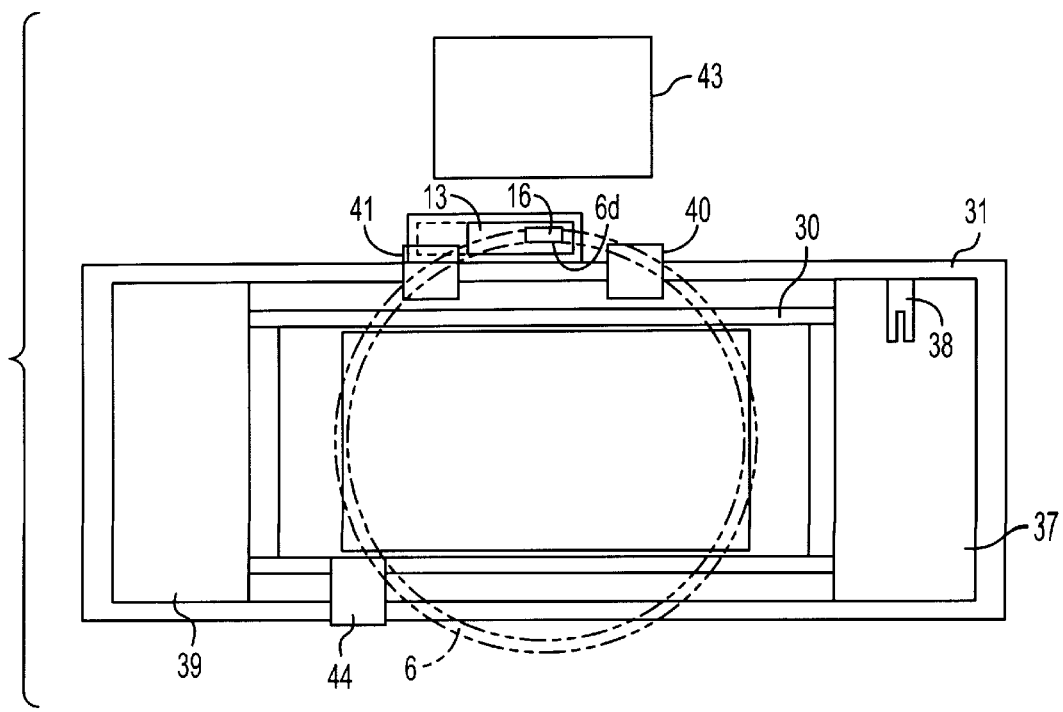
FIG. 16 is a sectional view illustrating an imaginary example of the barrier opening/closing camera.

FIG. 15 is a sectional view taken along the line X—X in FIG. 14. Shown in FIG. 15 are the film cartridge chamber 37, the fork 38, the spool chamber 39, the internal rail surface 30, and the external rail surface 31. Further, the numeral 44 designates a magnetic writing module for writing magnetic data on the film. Herein, the barrier opening/closing lever 16 is—because of being provided in the guide groove 6d of the rectilinear movement drum 6, though considered to be disposed within an alternate long and two short dashes line in FIG. 10—impossible of disposition within the range of the external rail 31 due to a passage of the film. Further, the barrier opening/closing member 16 is also impossible of being disposed in the vicinity of the circumferential uppermost position of the rectilinear movement drum 6 due to the interference with the photo interrupters 41, 40 shown in FIG. 16. The barrier opening/closing member 16 can be disposed only in the vicinity of the circumferential lowermost position.

Note that the main switch knob 14 is constructed to move the film feeding direction as in the same way with the moving member 13 in the embodiments discussed above. If the moving member 13 moves in the film feeding direction, however, the main switch knob 14 is not necessarily moved in the film feeding direction.

As discussed above, the barrier opening/closing camera according to the present invention is constructed such that the operation member is disposed in the face-to-face position to the film feed detecting device as well as to the finder optical system with the film aperture being interposed therebetween, and hence the barrier opening/closing mechanism can be provided together even in the camera with the finder mechanism and the film feed detecting device being provided upwardly of the aperture.

It is apparent that, in this invention, a wide range of different working modes can be formed based on the invention without deviating from the spirit and scope of the invention. This invention is not restricted by its specific working modes except being limited by the appended claims.

Although preferred embodiments of the invention have been shown and described, it will be appreciated by those skilled in the art that changes may be made in these embodiments without departing from the principles and spirit of the invention, the scope of which is defined in the claims and their equivalents.

What is claimed is:

1. A camera, comprising:
   an operating member;
   a photographic lens unit, operable between a retracted position and an extended position;
   a lens barrier unit, operable between a closed position and an open position; and
   a sliding member, mechanically coupled to said operating member, which moves with and against the photographic lens unit and slides in an optical axis direction to drive said lens barrier unit to one of said open position and said closed position in response to movement of said operating member.

2. The camera according to claim 1, wherein said lens barrier unit comprises plural lens barriers operable between a closed position and an open position.

3. The camera according to claim 1, wherein said sliding member is supported in a groove of a tube of said photographic lens unit.

4. The camera according to claim 3, wherein said sliding member is guided along said groove of said tube to drive said lens barrier unit to said closed position or to said open position in an optical axis direction of said photographic lens unit.

5. The camera according to claim 4, wherein said operating member is capable of an operation for photographic preparation and of an operation for the conclusion of photography in a direction generally perpendicular to said optical axis, and said sliding member is arranged at the side of said camera body in response to the movement of said operating member when operated for said photographic preparation.

6. The camera according to claim 5, wherein said operating member moves above an aperture of said camera body, in a direction parallel to a long side of said aperture.

7. The camera according to claim 6 further comprising
a rotary ring, for opening and closing said lens barrel unit, having a lug, which projects from said rotary ring in the optical axis direction; and
a driver, disposed in an upper portion of said aperture, having an abutment portion.

8. The camera according to claim 7, wherein said sliding member has an inclined surface portion formed at a front end, capable of engagement with said lug of said rotary ring, and an engagement portion formed at a rear end, capable of engagement with said abutment portion of said driver.

9. The camera according to claim 8, wherein said engagement portion at the rear end of said sliding member engages said abutment portion of said driver, and said inclined surface portion at said front end of said sliding member engages said lug of said rotary ring, when said operating member is operated for conclusion of photography.

10. The camera according to claim 8, wherein said engagement portion at the rear end of said sliding member is not engaged with said abutment portion of said driver, and said inclined surface portion at said front end of said sliding member is not engaged with said lug of said rotary ring, when said operating member is operated for photographic preparation.

11. A barrier opening/closing camera as claimed in claim 9, further comprising a film aperture disposed below said finder optical system.

12. The camera according to claim 7, further comprising a coupling member and wherein said driver is coupled to said operating member by said coupling member, and moves in a direction parallel to a long side of said aperture.

13. A barrier opening/closing camera as claimed in claim 12, further comprising a finder optical system to visually recognize an image of an object.

14. A barrier opening/closing camera as claimed in claim 12, further comprising a film feed detecting device to detect a film feed state by detecting film perforations.

15. A barrier opening/closing camera as claimed in claim 12, further comprising a main switch to turn power of said camera ON/OFF.

16. A camera comprising:
an operating member, capable of an operation for photographic preparation and of an operation for the conclusion of photography;
a photographic lens unit, movable to an extended position, in response to said operation for photographic preparation, and movable to a retracted position, in response to said operation for the conclusion of photography;
a lens barrier unit, operable between an open position and a closed position; and
a sliding member, which is a separate member from said operating member and mechanically coupled to said operating member, and which moves with and against the photographic lens unit and slides in an optical axis direction to drive said lens barrier unit to one of said open position or said closed position in response to a respective operation of the operating member.

17. A barrier opening/closing camera as claimed in claim 16, wherein said lens barrel assumes the second position when said main switch is turned ON and said lens barrel assumes the first position when said main switch is turned OFF.

18. A camera comprising:
a camera body;
an operating member, arranged in said camera body, capable of an operation for photographic preparation and of an operation for the conclusion of photography;
a photographic lens unit, including a photographic lens and a tube having a guide groove, movable to an extended position, in response to said operation for photographic preparation, and movable to a retracted position, more retracted into the camera body side than said extended position, in response to said operation for the conclusion of photography;
a lens barrier unit, covering a front surface of said photographic lens while in a closed position, and moving clear of said front surface of said photographic lens while in an open position; and
a sliding member, which is a separate member from said operating member and mechanically coupled to said operating member, and which moves with and against the photographic lens unit and slides in an optical axis direction to drive said lens barrier unit to said open position, in response to movement of said operating member during said operation for photographic preparation, and which drives said lens barrier unit to said closed position, in response to the movement of said photographic lens unit when moving from said extended position to said retracted position in response to said operation for the conclusion of photography.

19. The camera according to claim 18, wherein said lens barrier unit comprises first and second lens barriers cooperatively moveable between a closed position and an open position for covering the front surface of said photographic lens.

20. The camera according to claim 19, wherein said photographic lens is a zoom lens.

21. A camera comprising:
a camera body having an aperture;
an operating member arranged in said camera body;
a photographic lens unit, operable between a retracted position and an extended position;
a lens barrier unit, operable between a closed position and an open position;
a sliding member, mechanically coupled to said operating member, which moves with and against the photographic lens unit and slides in an optical axis direction to drive said lens barrier unit to one of said open position or said closed position in response to movement of said operating member; and
a driver, disposed in an upper portion of said aperture of said camera body, having an abutment portion.

22. A camera having a camera body having an aperture comprising:
an operating member, capable of an operation for photographic preparation and of an operation for the conclusion of photography;
a photographic lens unit, movable to an extended position, in response to said operation for photographic preparation, and movable to a retracted position, in response to said operation for the conclusion of photography;
a lens barrier unit, operable between an open position and a closed position;

a sliding member, which is a separate member from said operating member and mechanically coupled to said operating member, and which moves with and against the photographic lens unit and slides in an optical axis direction to drives said lens barrier unit to one of said open position or said closed position in response to a respective operation of the operating member; and a driver, disposed in an upper portion of said aperture of said camera body, having an abutment portion.

23. A camera comprising:

a camera body having an aperture;

an operating member, arranged in said camera body, capable of an operation for photographic preparation and of an operation for the conclusion of photography;

a photographic lens unit, including a photographic lens and a tube having a guide groove, movable to an extended position, in response to said operation for photographic preparation, and movable to a retracted position, more retracted into the camera body side than said extended position, in response to said operation for the conclusion of photography;

a lens barrier unit, covering a front surface of said photographic lens while in a closed position, and moving clear of said front surface of said photographic lens while in an open position;

a sliding member, which is a separate member from said operating member and mechanically coupled to said operating member, and which moves with and against the photographic lens unit and slides in an optical axis direction to drive said lens barrier unit to said open position, in response to movement of said operating member during said operation for photographic preparation, and which drives said lens barrier unit to said closed position, in response to the movement of said photographic lens unit when moving from said extended position to said retracted position in response to said operation for the conclusion of photography; and a driver, disposed in an upper portion of said aperture of said camera body, having an abutment portion.

24. A barrier opening/closing camera comprising:

a finder optical system to visually recognize an image of an object;

a film feed detecting device to detect a film feed state by detecting a film perforation;

a film aperture of which said finder optical system and said film feed detecting device are disposed upwardly;

a lens barrel, to hold a photographing lens, taking a non-photographing position and a photographing position;

a barrier unit provided in said lens barrel and assuming a closed state to cover said photographing lens and an open state to uncover said photographing lens;

a ring to set said barrier unit in the closed sate and the opened state by said ring rotating about an optical axis of said photographing lens, said ring having a cam follower portion;

a lever having a cam portion contacting said cam follower portion of said ring and moving along the optical axis of said photographing lens;

a slide member which moves with and against the lens barrel taking a first position to hinder said lever from retreating within a movement path of said lever in an optical-axis direction and a second position to permit the retreat off the movement path thereof; and a main switch to turn ON/OFF a power supply of said barrier opening/closing camera, wherein said lens barrel takes the photographing position when said main switch is turned ON but the non-photographing position when said main switch is turned OFF, said slide member sets said barrier unit in the opened state by permitting the retreat of said lever with said slide member taking the second position when said main switch is turned ON and thereby releasing said cam portion of said lever from the contact with said cam follower portion of said ring, and sets said barrier unit in the closed state by hindering said lever from retreating with said slide member taking the second position when said main switch is turned OFF and thereby bringing said cam portion of said lever into contact with said cam follower portion of said ring, and said lever and said slide member are disposed downwardly of said film aperture.

25. A barrier opening/closing camera comprising:

a rectilinear lens barrel to hold a photographic lens in one of a first, non-photographing position and a second, photographing position;

a barrier unit disposed in front of said photographic lens and having a closed state to cover said photographic lens and an open state to uncover said photographic lens; and a lever disposed in a position corresponding to a lower portion of said camera on said rectilinear lens barrel and being movable along an optical axis relative to said rectilinear lens barrel, wherein a movement of said lever along the optical axis relative to said rectilinear lens barrel drives said barrier unit between said open state and said closed state.

* * * * *

UNITED STATES PATENT AND TRADEMARK OFFICE
CERTIFICATE OF CORRECTION

PATENT NO. : 6,164,842
DATED : December 26, 2000
INVENTOR(S) : Hidefumi Ohta, et al.

It is certified that error appears in the above-identified patent and that said Letters Patent is hereby corrected as shown below:

Title page,
Item [75], Inventors: change "Takeuchii" to -- Takeuchi --;

Item [63], Related U. S. Application Data, should read as follows:
-- Continuation-in-part of application No. 08/968,512, Nov. 12, 1997, abandoned, which is a continuation of application No. 08/608,367, Feb. 28, 1996, abandoned, and of Continuation-in-part of application No. 08/928,257, Sept. 12, 1997, abandoned, which is a continuation of 08/664,125, Jun. 14, 1996, abandoned --.

Column 20, (claim 24),
Line 4, change "sate" to -- state --.

Signed and Sealed this

Twenty-third Day of October, 2001

Attest:

NICHOLAS P. GODICI
Attesting Officer
Acting Director of the United States Patent and Trademark Office